(12) United States Patent
Blendea et al.

(10) Patent No.: US 12,247,562 B2
(45) Date of Patent: Mar. 11, 2025

(54) PUMP NOISE ATTENUATOR AND METHOD THEREOF

(71) Applicant: LEGGETT & PLATT CANADA CO., Halifax (CA)

(72) Inventors: Horia Blendea, LaSalle (CA); Paul Tindall, Harrow (CA)

(73) Assignee: LEGGETT & PLATT CANADA CO., Halifax (CA)

( * ) Notice: Subject to any disclaimer, the term of this patent is extended or adjusted under 35 U.S.C. 154(b) by 54 days.

(21) Appl. No.: 17/661,493

(22) Filed: Apr. 29, 2022

(65) Prior Publication Data

US 2022/0260073 A1 Aug. 18, 2022

Related U.S. Application Data

(63) Continuation-in-part of application No. PCT/CA2020/000124, filed on Oct. 30, 2020.
(Continued)

(51) Int. Cl.
*F04B 53/16* (2006.01)
*B60N 2/90* (2018.01)
(Continued)

(52) U.S. Cl.
CPC ............. *F04B 53/16* (2013.01); *B60N 2/914* (2018.02); *F04B 45/047* (2013.01); *B60N 2/665* (2015.04); *F04B 53/001* (2013.01); *F04B 53/109* (2013.01)

(58) Field of Classification Search
CPC .. F04B 39/0044; F04B 45/043; F04B 53/003; F04B 43/025; F04B 43/026; F04B 45/04; F04B 43/02; F04D 29/668; H02K 5/15
(Continued)

(56) References Cited

U.S. PATENT DOCUMENTS

| 3,199,774 A | 8/1965 | Lowell |
| 3,203,447 A | 8/1965 | Bremner et al. |

(Continued)

FOREIGN PATENT DOCUMENTS

| CN | 2526615 Y | 12/2002 |
| CN | 103991396 A | 8/2014 |

(Continued)

OTHER PUBLICATIONS

G.Rau Innovative Metalle, "Thermal Actuators", 12 pages, retrieved Apr. 7, 2019.
(Continued)

*Primary Examiner* — Philip E Stimpert
(74) *Attorney, Agent, or Firm* — Michael Best & Friedrich LLP

(57) ABSTRACT

A pump assembly includes a pump with a pump body having a discharge passage, a motor operable to drive the pump to discharge compressed air through the discharge passage, a casing at least partially surrounding the pump and the motor, and a motor mount at least partially supporting the motor within the casing. The motor mount includes an outer axial wall, an inner axial wall, a radial wall extending between the outer axial wall and the inner axial wall, a first plurality of projections extending from the radial wall toward the motor, and a second plurality of projections extending from the radial wall away from the motor.

24 Claims, 15 Drawing Sheets

Related U.S. Application Data

(60) Provisional application No. 63/185,228, filed on May 6, 2021, provisional application No. 63/014,808, filed on Apr. 24, 2020, provisional application No. 62/929,577, filed on Nov. 1, 2019.

(51) Int. Cl.
*F04B 45/047* (2006.01)
*F04B 53/00* (2006.01)
*F04B 53/10* (2006.01)
*B60N 2/66* (2006.01)

(58) Field of Classification Search
USPC .......................................................... 417/360
See application file for complete search history.

(56) References Cited

U.S. PATENT DOCUMENTS

| | | |
|---|---|---|
| 3,442,483 A | 5/1969 | Schwartz |
| 4,115,039 A | 9/1978 | Schjelde et al. |
| 4,529,214 A | 7/1985 | Stoll et al. |
| 4,548,041 A | 10/1985 | Taylor |
| 4,630,799 A | 12/1986 | Nolan et al. |
| 4,674,398 A | 6/1987 | Taylor |
| 4,697,612 A | 10/1987 | Kleineberg et al. |
| 4,903,732 A | 2/1990 | Allen |
| 4,922,965 A | 5/1990 | Meister |
| 4,973,024 A | 11/1990 | Homma |
| 5,148,833 A | 9/1992 | Ota |
| 5,211,371 A | 5/1993 | Coffee |
| 6,098,000 A | 8/2000 | Long et al. |
| 6,132,183 A | 10/2000 | Li et al. |
| 6,135,726 A | 10/2000 | Robertson et al. |
| 6,203,105 B1 | 3/2001 | Rhodes, Jr. |
| 6,499,509 B2 | 12/2002 | Berger et al. |
| 7,331,773 B2 | 2/2008 | Nawa |
| 7,744,059 B2 | 6/2010 | Jerg |
| 7,815,161 B2 | 10/2010 | Saitoh et al. |
| 8,499,779 B2 | 8/2013 | Gillespie |
| 8,629,745 B2 | 1/2014 | Sturman et al. |
| 8,784,080 B2 | 7/2014 | Dorfler et al. |
| 8,794,707 B2 | 8/2014 | Bocsanyi et al. |
| 9,186,853 B2 | 11/2015 | Khan et al. |
| 9,797,521 B1 | 10/2017 | Davis |
| 9,945,490 B2 | 4/2018 | Dankbaar et al. |
| 9,951,765 B2 | 4/2018 | Ki et al. |
| 10,066,756 B2 | 9/2018 | Sohn |
| 10,107,279 B2 | 10/2018 | Dankbaar et al. |
| 10,107,410 B2 | 10/2018 | Dankbaar et al. |
| 10,207,619 B2 | 2/2019 | Dankbaar et al. |
| 10,290,876 B2 | 5/2019 | Prieto et al. |
| 10,378,677 B2 | 8/2019 | Kuszneruk et al. |
| 10,753,494 B2 | 8/2020 | Beuschel et al. |
| 10,948,097 B2 | 5/2021 | Dorfler et al. |
| 11,073,219 B2 | 7/2021 | Dorfler et al. |
| 11,287,456 B2 | 3/2022 | Wang et al. |
| 11,422,169 B2 | 8/2022 | Ferraro et al. |
| 2002/0112788 A1 | 8/2002 | Tanaka et al. |
| 2003/0178074 A1 | 9/2003 | Itzhaky |
| 2005/0005980 A1 | 1/2005 | Eberhardt et al. |
| 2005/0053487 A1 | 3/2005 | Munker et al. |
| 2005/0139610 A1 | 6/2005 | Crossdale et al. |
| 2006/0034707 A1 | 2/2006 | Thomas et al. |
| 2006/0034708 A1 | 2/2006 | Thomas et al. |
| 2007/0023089 A1 | 2/2007 | Beyerlein et al. |
| 2007/0140879 A1* | 6/2007 | Huang ............... F04B 45/047 417/472 |
| 2007/0237653 A1 | 10/2007 | Wang |
| 2007/0237654 A1 | 10/2007 | Kasuya et al. |
| 2008/0271559 A1 | 11/2008 | Garscha et al. |
| 2010/0139785 A1 | 6/2010 | Saitoh et al. |
| 2010/0226805 A1 | 9/2010 | Kulmer |
| 2011/0095216 A1 | 4/2011 | Degreef et al. |
| 2012/0067430 A1 | 3/2012 | Deperraz et al. |
| 2012/0143108 A1 | 6/2012 | Bocsanyi et al. |
| 2012/0153043 A1 | 6/2012 | Arekar et al. |
| 2012/0199768 A1 | 8/2012 | Love et al. |
| 2013/0064689 A1 | 3/2013 | White et al. |
| 2014/0103232 A1 | 4/2014 | Deperraz |
| 2014/0232155 A1 | 8/2014 | Bocsanyi et al. |
| 2015/0028234 A1 | 1/2015 | Kraus et al. |
| 2016/0018016 A1 | 1/2016 | Dankbaar et al. |
| 2016/0153575 A1 | 6/2016 | Sohn |
| 2016/0207075 A1 | 7/2016 | Alexander et al. |
| 2017/0298913 A1 | 10/2017 | Kim et al. |
| 2018/0023906 A1 | 1/2018 | Tajiri et al. |
| 2018/0038514 A1 | 2/2018 | Kusneruk et al. |
| 2018/0119686 A1 | 5/2018 | Shakal et al. |
| 2018/0135615 A1 | 5/2018 | Snyder et al. |
| 2018/0283571 A1 | 10/2018 | Miyazoe et al. |
| 2018/0306212 A1 | 10/2018 | Weickel et al. |
| 2018/0363642 A1 | 12/2018 | Salih et al. |
| 2019/0003609 A1 | 1/2019 | Asai et al. |
| 2019/0107214 A1 | 4/2019 | Kruppe et al. |
| 2019/0116681 A1 | 4/2019 | De Carolis et al. |
| 2019/0118690 A1 | 4/2019 | Beuschel et al. |
| 2019/0120402 A1 | 4/2019 | Jamison et al. |
| 2019/0195246 A1 | 6/2019 | Jamison et al. |
| 2019/0353268 A1 | 11/2019 | Dorfler et al. |
| 2019/0353270 A1 | 11/2019 | Dorfler et al. |
| 2020/0088314 A1 | 3/2020 | Samain et al. |
| 2020/0378516 A1 | 12/2020 | Beuschel et al. |
| 2020/0378527 A1 | 12/2020 | Stephan et al. |
| 2021/0018109 A1 | 1/2021 | Beuschel et al. |
| 2022/0106955 A1 | 4/2022 | Auernhammer et al. |
| 2022/0205551 A1 | 6/2022 | Nicola et al. |
| 2022/0243827 A1 | 8/2022 | Nicola et al. |
| 2022/0372969 A1 | 11/2022 | Hines |

FOREIGN PATENT DOCUMENTS

| | | |
|---|---|---|
| CN | 105465090 A | 4/2016 |
| CN | 108953683 A | 12/2018 |
| CN | 109318770 A | 2/2019 |
| CN | 110030180 A | 7/2019 |
| DE | 19545011 A1 | 4/1997 |
| DE | 19718169 A1 | 11/1998 |
| DE | 10063478 A1 | 7/2002 |
| DE | 102005060217 A1 | 7/2006 |
| DE | 102006053147 A1 | 5/2007 |
| DE | 102011100327 B3 | 8/2012 |
| DE | 102013208820 A1 | 11/2014 |
| DE | 202014006875 U1 | 12/2014 |
| DE | 102015201534 B3 | 4/2016 |
| DE | 102014225756 A1 | 6/2016 |
| DE | 102016225519 A1 | 6/2018 |
| DE | 102017204662 B3 | 7/2018 |
| DE | 102017107073 A1 | 10/2018 |
| DE | 102017217213 B3 | 3/2019 |
| DE | 102018200635 A1 | 7/2019 |
| DE | 202020107139 U1 | 3/2021 |
| EP | 0423045 A1 | 4/1991 |
| EP | 1619287 A1 | 1/2006 |
| EP | 1909008 A1 | 4/2008 |
| EP | 1988440 A1 | 11/2008 |
| EP | 2078891 A2 | 7/2009 |
| EP | 2740521 A1 | 6/2014 |
| EP | 2860401 A2 | 4/2015 |
| EP | 3343078 A1 | 7/2018 |
| GB | 830393 A | 3/1960 |
| GB | 830394 A | 3/1960 |
| GB | 971816 A | 10/1964 |
| JP | 4091035 B2 | 5/2008 |
| WO | 2004104462 A1 | 12/2004 |
| WO | 2009015528 A1 | 2/2009 |
| WO | 2012159689 A1 | 11/2012 |
| WO | 2014135909 A1 | 9/2014 |
| WO | 2015185132 A | 12/2015 |
| WO | 2018005528 A1 | 1/2018 |
| WO | 2018049526 A1 | 3/2018 |
| WO | 2018065217 A1 | 4/2018 |
| WO | 2019124131 A1 | 6/2019 |

(56) References Cited

FOREIGN PATENT DOCUMENTS

| | | |
|---|---|---|
| WO | 2019149498 A1 | 8/2019 |
| WO | 2019207451 A2 | 10/2019 |
| WO | 2019218072 A1 | 11/2019 |

OTHER PUBLICATIONS

International Search Report and Written opinion for Application No. PCT/CA2020/000124 dated Feb. 4, 2021 (8 pages).
International Preliminary Report on Patentability for Application No. PCT/CA2020/000124 dated May 12, 2022 (6 pages).
European Patent Office Partial Supplementary European Search Report for application 20882512.5, dated Sep. 27, 2023 (15 pages).
International Preliminary Report on Patentability for Application No. PCT/CA2022/050657 dated Oct. 24, 2023 (6 pages).
International Search Report and Written opinion for Application No. PCT/CA2022/050657 dated Jul. 29, 2022 (10 pages).
European Patent Office Extended Search Report for Application No. 20882512.5 dated Jan. 5, 2024 (14 pages).
Chinese Patent Office Action for Application No. 202080076057.3 dated Dec. 22, 2023 (28 pages including English translation).
European Patent Office Action for Application No. 22798449.9 dated Nov. 21, 2024 dated (8 pages).

\* cited by examiner

PUMP NOISE ATTENUATOR AND METHOD THEREOF

CROSS-REFERENCE TO RELATED APPLICATIONS

This application is a continuation-in-part of co-pending International Patent Application No. PCT/CA2020/000124, filed Oct. 30, 2020, which claims priority to U.S. Provisional Patent Application No. 63/014,808, filed Apr. 24, 2020, and to U.S. Provisional Patent Application No. 62/92,577, filed Nov. 1, 2019. This application further claims priority to co-pending U.S. Provisional Patent Application No. 63/185,228, filed May 6, 2021. The entire contents of each of the foregoing is incorporated herein by reference.

BACKGROUND

The present disclosure relates to a pump noise attenuator and method for commercial and residential use, and more specifically for use within vehicular seating systems (aircraft, automobiles, etc.).

SUMMARY

The present disclosure provides a configuration for a pump and a method of pumping air from a pump and into a pneumatic line that provides for improved reduction and/or optimization of pump noise. As described in greater detail below, an end cap and/or seal and motor mount configuration may reduce noise generated by air flowing through a pump assembly during operation of a pneumatic bladder system. The resulting pump assembly may be advantageously used in applications of the pneumatic bladder system (e.g., in vehicle seats, massage chairs, etc.) where quieter operation is desirable.

For example, the present disclosure provides, in one aspect, a pump assembly including a pump with a pump body having a discharge passage, a motor operable to drive the pump to discharge compressed air through the discharge passage, a casing at least partially surrounding the pump and the motor, and a motor mount at least partially supporting the motor within the casing. The motor mount includes an outer axial wall, an inner axial wall, a radial wall extending between the outer axial wall and the inner axial wall, a first plurality of projections extending from the radial wall toward the motor, and a second plurality of projections extending from the radial wall away from the motor.

The present disclosure provides, in another aspect, a pump assembly including a diaphragm with a wall defining an interior volume, a plunger coupled to the wall, the plunger including a circumferential rib, and a drive mechanism configured to reciprocate the plunger to perform cycles of compressing and expanding the interior volume. The circumferential rib is engageable with the wall of the diaphragm as the interior volume is compressed to support the wall.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. In addition, as used herein, the terms "upper", "lower", and other directional terms are not intended to require any particular orientation but are instead used for purposes of description only.

DETAILED DESCRIPTION

It may be desirable to reduce noise created by a pump during operation. For example, when configuring a pump for a specific application it may be desirable to reduce, change, or remove a frequency of vibration created by a pump, which can manifest as noise heard by a user of an application for the pump. In general, two types of noise may be produced by a pump: motor noise and pumping noise. In some pumps, for example pneumatic pumps that are connected to an air bladder, the air bladder may act as a speaker that amplifies periodic bursts of air produced by the pump when the pump is operating. To reduce such noise, pumps according to the present disclosure may be located in a plastic housing filled with foam, suspended on rubber mounts, and/or include a muffler placed along an output line from the pump.

Figure 1:
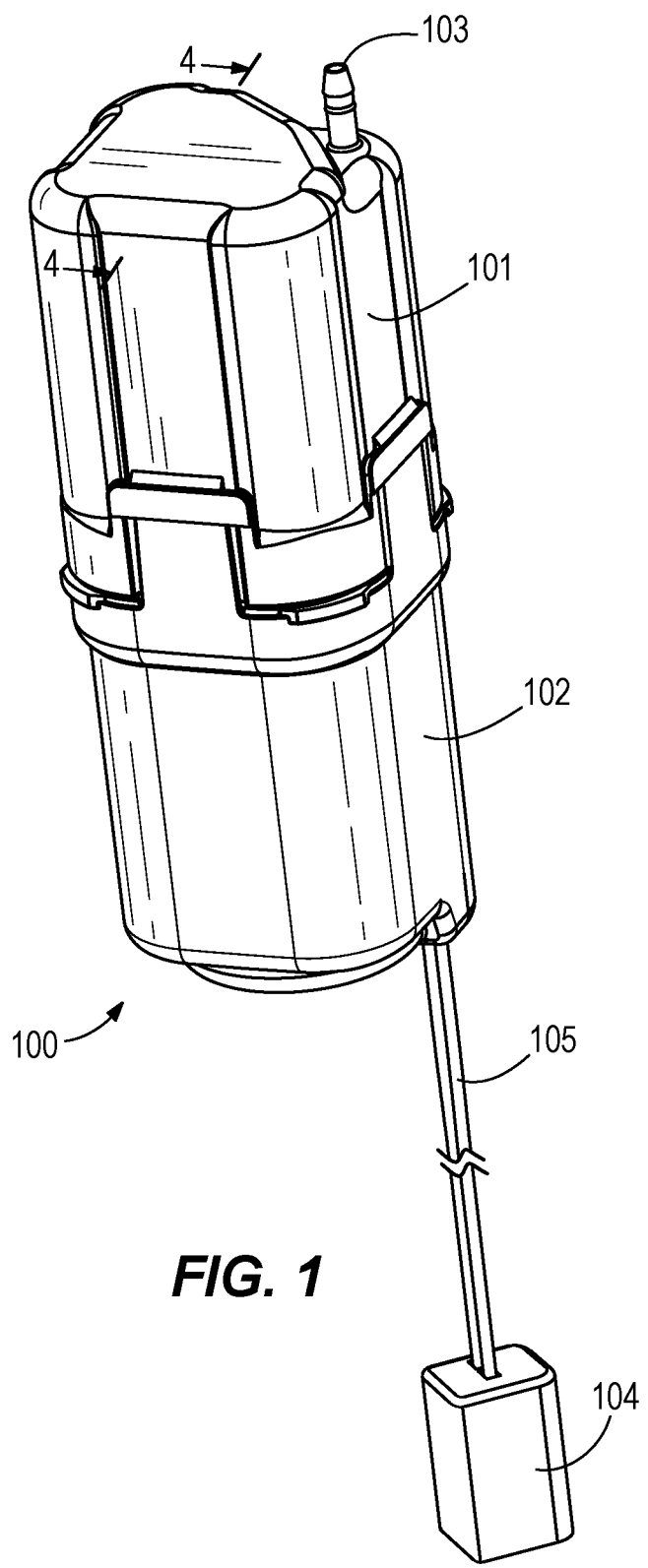
FIG. 1 is a perspective view of an embodiment of a pump assembly according to the present disclosure.

For example, FIG. 1 illustrates a pump assembly 100 including a first or upper casing 101 and a second or lower casing 102. In an embodiment, the pump assembly 100 is configured for providing air for use in an application, for example in an automotive application. Such air may be provided from the pump assembly 100 through an upper casing outlet 103. The pump assembly 100 may include a pump configured to run (i.e., pump air through the upper casing outlet 103) using an electrical connection 105, which may supply electric power to the pump assembly 100. The electrical connection 105 may, through the use of a connector 104, be connected to a power source.

Figure 2:
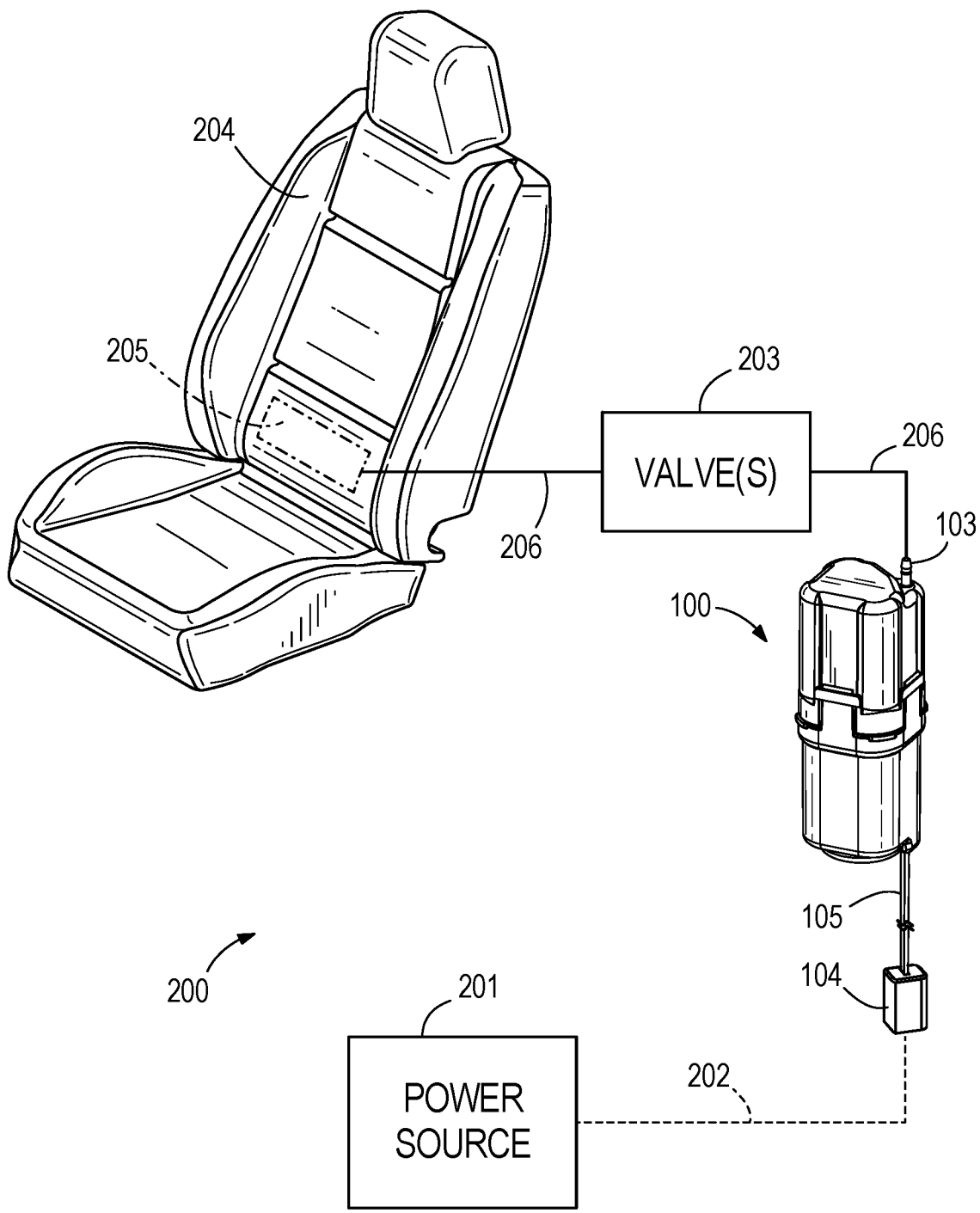
FIG. 2 is a schematic illustration of a pneumatic system according to the present disclosure, including the pump assembly of FIG. 1.

FIG. 2 illustrates an embodiment of a pneumatic system 200 including the pump assembly 100. The pneumatic system 200 may be a portion of an automobile. For example, in the illustrated embodiment, the pneumatic system 200 is part of an automobile seating assembly. Other applications of the pneumatic system 200 are contemplated, however, such as aerospace applications, office/desk chair applications, or the like.

In the illustrated embodiment, the pneumatic system 200 includes a power source 201, which may be part of an electrical power system of an automobile. The connector 104 is configured to connect to the power source 201. As such, the power source 201 may supply power 202 (e.g., at 12 Volts or 24 Volts in some embodiments) through the electrical connection 105 and to the pump assembly 100 via the connector 104.

When the pump assembly 100 is powered, the pump assembly 100 may operate to pump air through the upper casing outlet 103. Air may flow from the upper casing outlet 103 through a pneumatic line 206. The pneumatic line 206 may include valves 203 along or at either end of the pneumatic line 206. The valves 203 may be a single valve and/or may be multiple valves, and in either case may serve to: (i) direct air along the pneumatic line 206 from the pump assembly 100, (ii) stop a flow of air along the pneumatic line 206 directed from the pump assembly 100, (iii) regulate pressure of a flow of air through the pneumatic line 206, and/or (iv) regulate flow rate of a flow of air through the pneumatic line 206. Additionally or alternatively, the valves 203 may include a release valve, which may allow air to vent from the pneumatic line 206 to the atmosphere or into another, connected pneumatic line.

The pneumatic line 206 may be connected to one or more bladders 205. The bladder 205 may be configured to expand or contact as air from the pneumatic line 206 flows into or is removed from the bladder 205. In an embodiment, the bladder 205 may be supported in a bladder supporting device 204. In some embodiments, the bladder supporting device 204 is a seat configured to be positioned within an automobile. In an embodiment, the bladder 205 may be positioned within the bladder supporting device 204 to provide lumbar support when a user sits against the bladder supporting device 204. In such an embodiment, the user may provide a request for increasing or decreasing lumbar support (e.g., the user may press a button) which may activate the pump assembly 100 to provide air from the pump assembly 100, through the pneumatic line 206, and into the bladder 205 positioned within the bladder supporting device 204, thereby inflating the bladder 205 and providing the requested lumber support.

Figure 3:
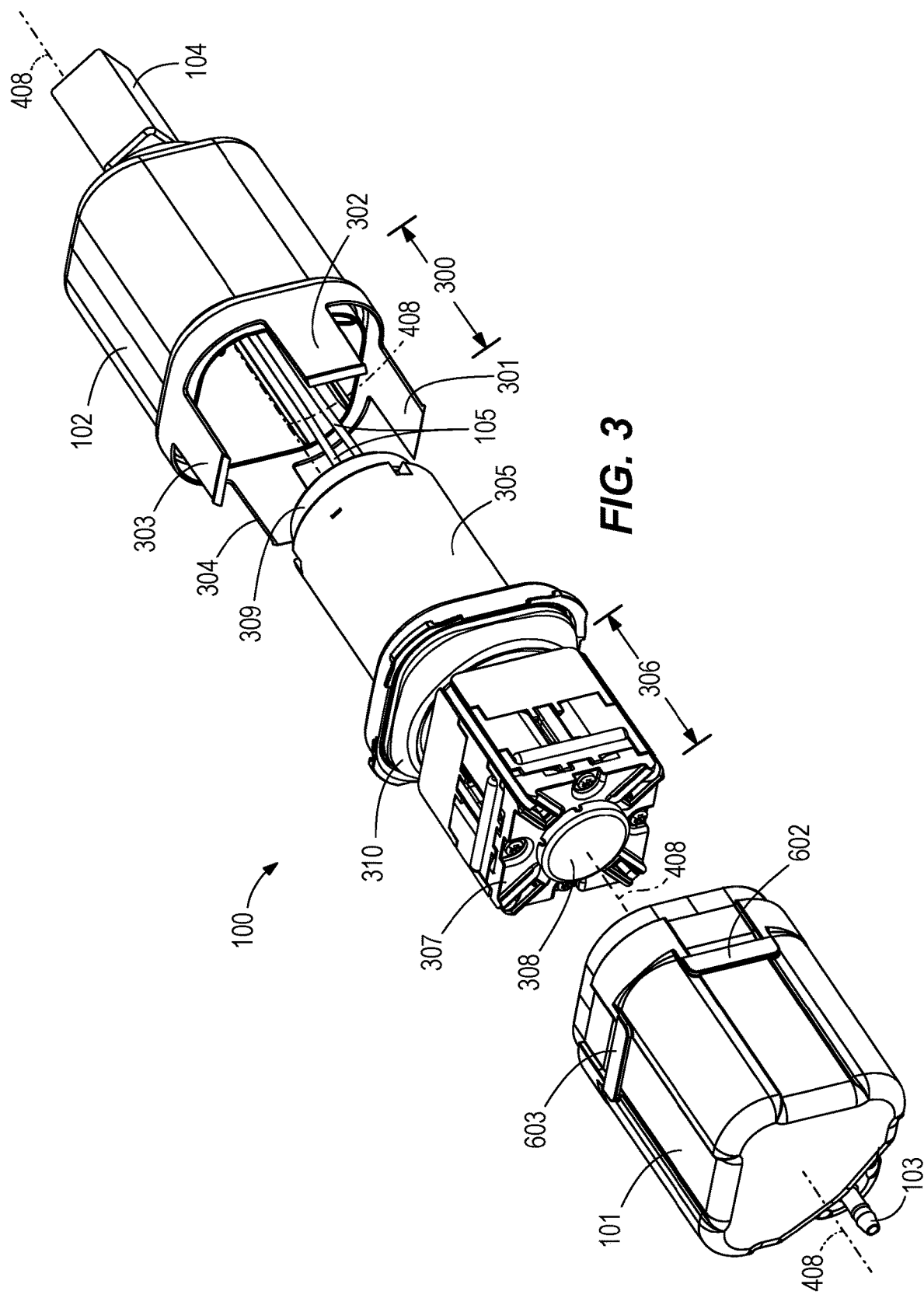
FIG. 3 is an exploded view of the pump assembly of FIG. 1.

FIG. 3 illustrates an assembly view of an embodiment of the pump assembly 100 along a longitudinal axis or central axis 408. The pump assembly 100 may include the upper casing 101 and a lower casing 102. The upper casing may include the upper casing outlet 103. The lower casing 102 may be configured to engage the upper casing 101. For example, the lower casing may include a locking device 300 configured to engage the upper casing 101. In an embodiment, the locking device 300 includes four lock members 301, 302, 303, and 304 positioned equidistantly around a circumference of the upper casing 101. Each of the lock members 301, 302, 303, and 304 may be configured to engage a corresponding receiving portion, for example receiving portions 602 and 603 shown in FIG. 3. As such, to connect the upper casing 101 with the lower casing 102, the lock members 302 and 303 may engage (e.g., by clipping into) the receiving portions 602 and 603.

In an embodiment, a seal 310 may be positioned between the upper casing 101 and the lower casing 102 to provide a substantially air-tight seal between the upper casing 101 and the lower casing 102. In an embodiment, the seal 310 comprises rubber or another suitable resilient elastomeric material. Greater detail regarding the seal 310 is provided in reference to FIG. 4.

With continued reference to FIG. 3, the connector 104 and the electrical connection 105 may pass through a motor mount 309 and into a lower pump assembly 305. The lower pump assembly 305 may be connected to an upper pump assembly 306. The seal 310 may be located at the connection between the lower pump assembly 305 and the upper pump assembly 306, and may engage both the lower pump assembly 305 and the upper pump assembly 306. Accordingly, when the upper casing 101 is connected to the lower casing 102, the seal 310 may retain the lower pump assembly 305 and the upper pump assembly 306 because the seal 310 at the same time may also engage the upper casing 101 and the lower casing 102. The motor mount 309 may be configured to engage the lower pump assembly 305 and the lower casing 102 when the lower casing 102 is locked to the upper casing 101.

The upper pump assembly 306 may be connected to an outlet plate 307, which may be positioned on an opposite side of the upper pump assembly 306 from the seal 310. An end cap 308 may be positioned on/adjacent the outlet plate 307 and positioned on the opposite side of the outlet plate 307 from the upper pump assembly 306. In some embodiments, the cap 308 may be integrally formed with the outlet plate 307 and/or other portions of the upper pump assembly 306. In other embodiments, the cap 308 may be formed separately and coupled to the outlet plate 307 by a snap-fit, one or more fasteners, adhesive(s), or any other suitable means.

Figure 4:
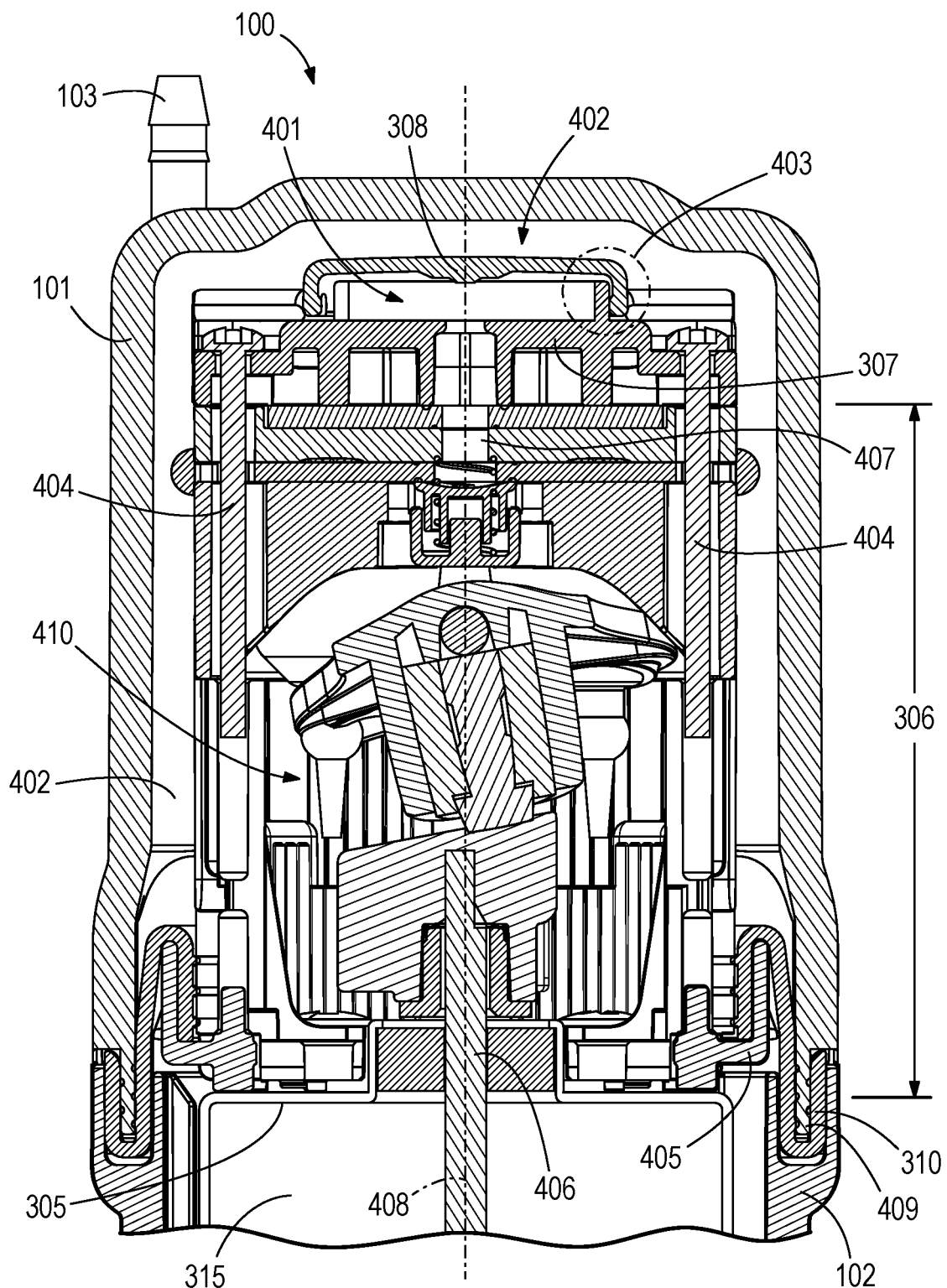
FIG. 4 is a cross-sectional view along a central axis of the pump assembly of FIG. 1.

FIG. 4 illustrates a cross-section view along the central axis 408 of a portion of the pump assembly 100. In FIG. 4, the lower pump assembly 305 is shown connected to the upper pump assembly 306. A drive interface 406 may extend between the lower pump assembly 305 and the upper pump assembly 306 and may provide electrical and/or mechanical communication between the lower pump assembly 305 and the upper pump assembly 306. For example, the lower pump assembly 305 may include an electric motor 315, and the upper pump assembly 306 may include a pneumatic pump 410. In such an embodiment, the drive interface 406 may communicate rotational energy (for example, via a driveshaft) to the upper pump assembly 306 to drive the pneumatic pump 410 contained therein.

The pneumatic pump 410 may pump air through an upper assembly outlet 407 in the outlet plate 307 and into a first volume (i.e., a first chamber) 401. The upper assembly outlet 407 may be positioned along and parallel to the central axis 408. The outlet plate 307 may be secured to the upper pump assembly 306 via a plurality of pins 404 or in any other suitable manner. In other embodiments, the outlet plate 307 may be integrally formed with one or more portions of the upper pump assembly 306. The first volume 401 in the illustrated embodiment is defined by the outlet plate 307 and the end cap 308. The first volume 401 is in communication with the upper assembly outlet 407 such that air discharged by the pneumatic pump 410 enters the first volume 401.

Figure 5:
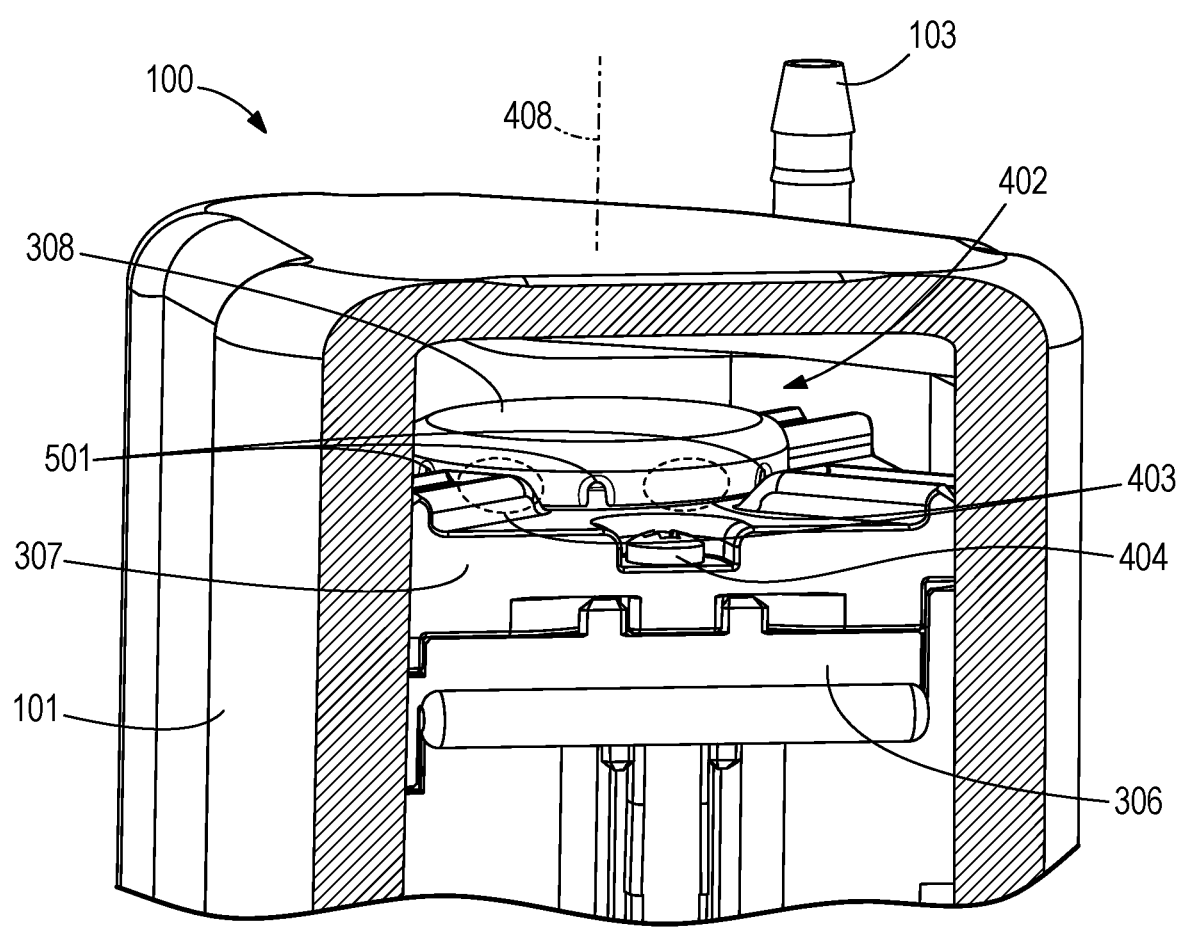
FIG. 5 is a cross-sectional view offset from a central axis of the pump assembly of FIG. 1, illustrating a cap of the pump assembly.

With reference to FIG. 5, the end cap 308 may be substantially sealed to the outlet plate 307 via a plurality of inter-engaging features or snaps 403. Air that is pumped into the first volume 401 may be forced out and into a second volume (i.e., a second chamber) 402 by the pneumatic pump 410 via a plurality of outlets 501 arranged about the periphery of the end cap 308. While the end cap 308 is shown with the plurality of spaced outlets 501 spaced by the equidistantly spaced snaps 403, either and/or both of the outlets 501 and the snaps 403 may be provided singularly or non-uniformly about the end cap 308. The plurality of outlets 501 from the end cap 308 may be positioned offset and equidistant from the central axis 408 and may additionally or alternatively be positioned perpendicular to the central axis 408.

Referring again to FIG. 4, the second volume 402 may be defined by the end cap 308, the outlet plate 307, the upper pump assembly 306, the seal 310 and the upper casing 101. In the illustrated embodiment, the second volume 402 surrounds the first volume 401, and the second volume 402 may extend cylindrically along the central axis 408 to the seal 310, which serves to terminate the second volume 402 (i.e., the second volume 402 extends around the entire head of the pump 410). Air may then be forced from the second volume 402 and out of the upper casing outlet 103 to be used in a downstream application. In an embodiment, the upper casing outlet 103 may be positioned parallel to the central axis 408.

In the illustrated embodiment, the first volume 401 is smaller than the second volume 402. As such, the first volume 401 may act as a first resonant cavity for higher frequency vibrations (e.g., greater than 500 Hz) emitted from the pneumatic pump 410. The second volume 402 may act as a resonant chamber for lower frequency vibrations (e.g., 500 Hz or less) emitted by the pneumatic pump 410. The relative volumes of the first volume 401 and the second volume 402 may be tuned to remove specific frequency vibrations emitted from the pneumatic pump 410. In such an embodiment, the combination of the end cap 308, the first volume 401 and the second volume 402 may serve to muffle or diminish sound created by the operation of the pneumatic pump 410.

For example, the first volume 401 may be configured to resonate at a relatively high, first resonant frequency (e.g., above 500 Hertz (Hz) in some embodiments) and the second volume 402 may be configured to resonate at a lower, second resonant frequency (e.g., below 500 Hz). In some embodiments, the first resonant frequency is at least 10% higher than the second resonant frequency. In some embodiments, the first resonant frequency is at least 25% higher than the second resonant frequency. As airflow passes through the volumes 401, 402 during operation, the differing resonances of the volumes 401, 402 may produce destructive interference that attenuates the sound produced by air flowing through the pump assembly 100. This is accomplished without any active noise cancelling or absorbent materials (e.g., foam, baffles, etc.) lining the airflow path, which would tend to increase flow resistance and decrease flow rate.

Furthermore, the configurations described and illustrated herein may be desirable to limit sound from vibrations and air pulses created by the pneumatic pump 410. The upper casing outlet 103 is not in direct communication with the upper assembly outlet 407 in the illustrated embodiment, because the first volume 401 and the second volume 402 are disposed fluidly between the upper assembly outlet 407 and the upper casing outlet 103. That is, air discharged from the pneumatic pump 410 through the upper assembly outlet 407 must pass through both the first volume 401 and the second volume 402 before being discharged from the pump assembly 100 through the upper casing outlet 103. In addition, the orientations of the outlets 501 in the end cap 308 (e.g., perpendicular to the central axis 408) and the orientation of the upper casing outlet 103 (e.g., parallel to the central axis 408) may also force the pumped air to change directions and thereby form a tortuous pathway for the pumped air. These features may advantageously reduce downstream noise amplification effects that may be produced by the bladder(s) 205 or other components of the pneumatic system 200.

Referring to FIG. 4, the seal 310 may be configured to reduce vibration of the pneumatic pump 410 and/or motor 315 and thereby further reduce noise generated by the pump assembly 100. For example, the seal 310 may extend along the central axis 408 and toward the end cap 308, between the upper pump assembly 306 and a support flange 405 fixed to a lower end of the upper pump assembly 306. Then, the seal 310 may wrap around the support flange 405 and extend away from the end cap 308 and along the central axis 408 to an upper casing extension 409 while positioned between the support flange 405 and the upper casing 101. Then, the seal 310 may wrap around the upper casing extension 409 and extend back toward the end cap 308 along the central axis 408 while positioned between the upper casing 101 and the lower casing 102. Finally, the seal 310 may extend radially away from the central axis 408 and between the upper casing 101 and the lower casing 102. In such an embodiment, the upper casing 101 may be held tightly against the lower casing 102 via the locking device 300, thereby compressing the seal 310 and forming an air-tight seal to enclose the second volume 402 everywhere except at the upper casing outlet 103. In such an embodiment, the seal 310 may serve as a vibration damper to dampen vibration created by the pneumatic pump 410 and/or motor 315.

Figure 6:
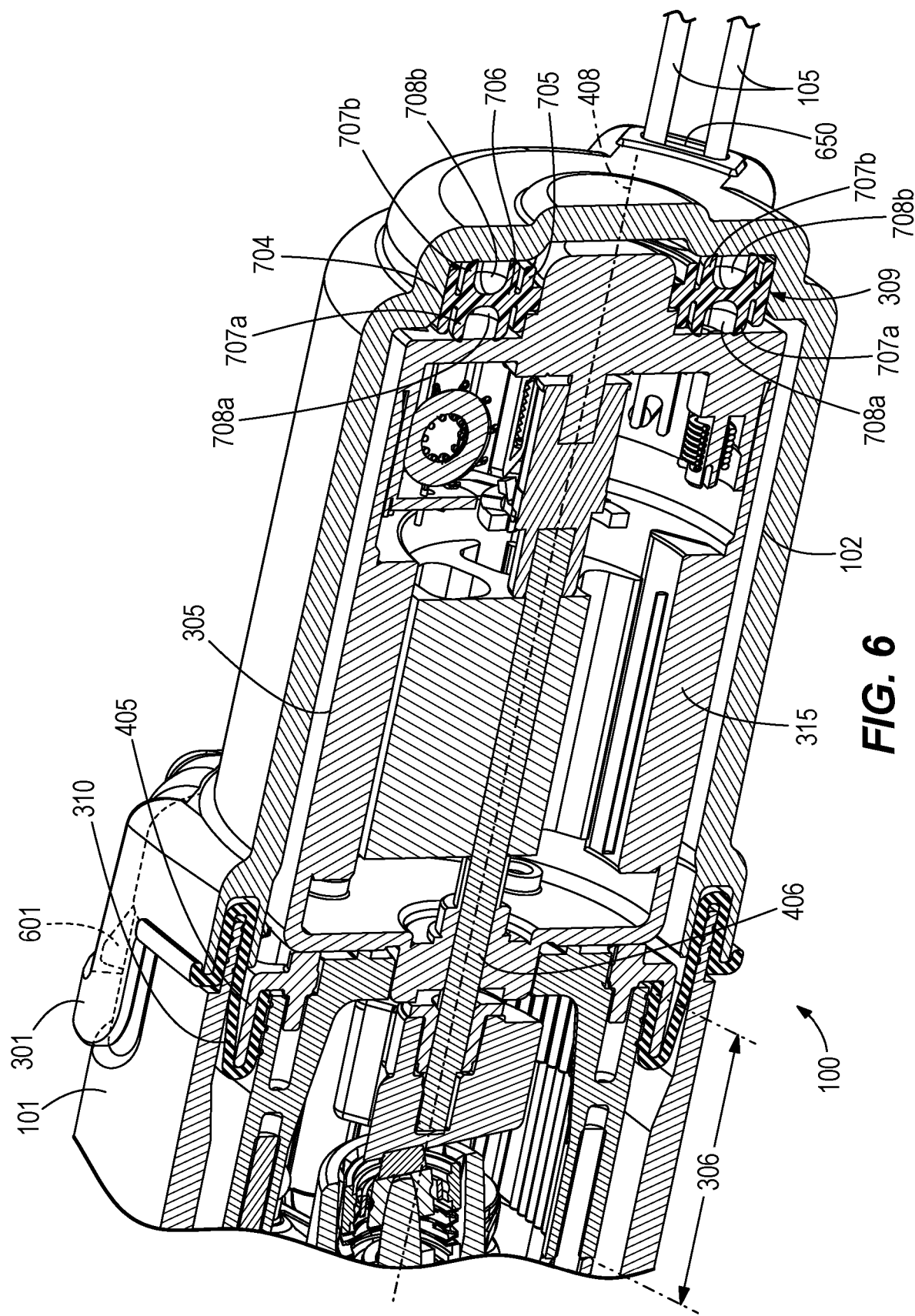
FIG. 6 is another cross-sectional view along a central axis of the pump assembly of FIG. 1.

FIG. 6 illustrates a cross-section view along the central axis 408 of an embodiment of the pump assembly 100. In FIG. 6, the upper casing 101 and the lower casing 102 are locked via the locking device 300, specifically the lock member 301 and upper assembly receiving portion 601 are shown engaged in FIG. 6. Accordingly, the seal 310 is compressed between the upper casing 101, the lower casing 102, and the support flange 405. In such a configuration, the upper pump assembly 306 is likewise held in place axially in the direction away from the lower pump assembly 305 and along the central axis 408 by the engagement of the support flange 405 and the seal 310.

The lower pump assembly 305 is supported at its end opposite the upper pump assembly 306 by the motor mount 309, which may be compressible. In some embodiments, the motor mount 309 may be retained in a compressed position by the support flange 405 engaging the seal 310. Such a configuration may retain the upper pump assembly 306, which may contact the lower pump assembly 305 and may compress the motor mount 309 between the lower pump assembly 305 and the lower casing 102. In an embodiment, the motor mount 309 may include rubber or another suitable resilient elastomeric material. In such a configuration, the motor mount 309 may further act to dampen vibrations created by the pneumatic pump 410 and/or the motor 315. Further, in such a configuration, the only contact points between the pneumatic pump 410 and the upper casing 101, and between the motor 315 and the lower casing 102 are resilient contact points (via the seal 310 and the motor mount 309), thereby further damping the vibration. Stated otherwise, the pneumatic pump 410 and the motor 315 may be fully supported on resilient rubber/elastomeric mounts.

As shown in FIG. 6, the motor mount 309 still allows for access for the electrical connection 105 to connect to the lower pump assembly 305 to power the pneumatic pump. For example, the motor mount 309 includes an inlet opening 650 that provides a passage for the electrical connection 105. In some embodiments, the inlet opening 650 also serves as an air inlet to the pump assembly 100 to provide an air supply for the pneumatic pump 410.

Figure 7:
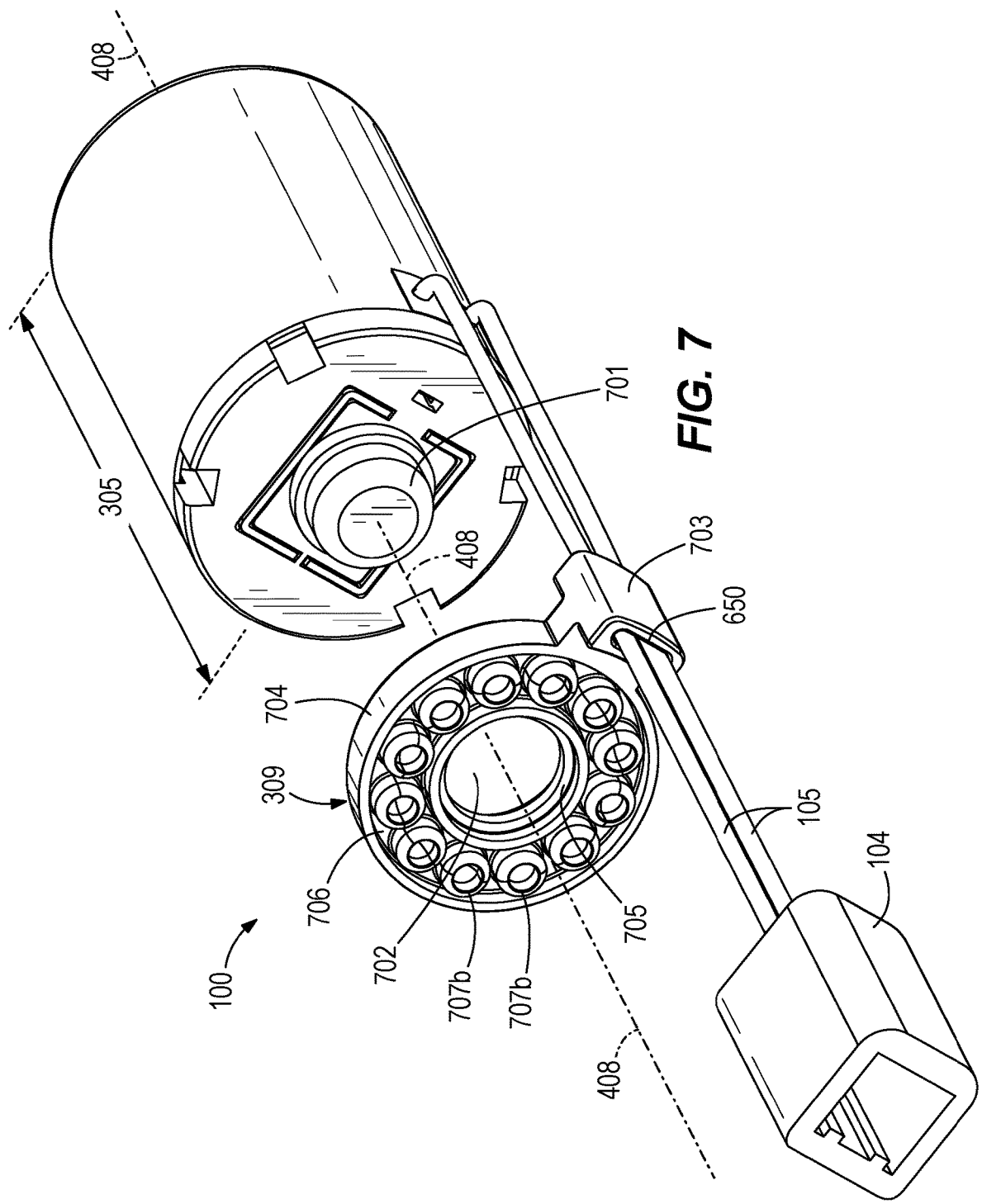
FIG. 7 illustrates a partially assembled view of an embodiment of the pump assembly of FIG. 1 with a lower casing removed.

FIG. 7 illustrates an assembly view of an embodiment of the pump assembly 100. FIG. 7 is provided without the lower casing 102 for illustration purposes. As shown, the motor mount 309 may be configured with a motor mount recess 702. As such, the illustrated motor mount 309 has an annular shape. The motor mount recess 702 may be configured to engage a lower pump assembly engagement portion 701 positioned on the lower pump assembly 305. As shown, the lower pump assembly engagement portion 701 may be generally cylindrical and configured to engage the correspondingly cylindrical motor mount recess 702. While not required to be cylindrical, providing both the lower pump assembly engagement portion 701 and the motor mount recess 702 in a cylindrical configuration may provide the additional advantage of damping in a radial direction perpendicular to the central axis 408. In such an embodiment damping of the pneumatic pump 410 and motor 315 is improved because the seal 310 (not shown in FIG. 7) and the motor mount 309 together provide for radial damping along the central axis 408 at two different locations along the central axis 408, which removes or limits another degree of freedom of vibration, namely, vibration rotationally along the central axis 408.

Referring to FIG. 6, the illustrated motor mount 309 includes an outer axial wall 704, an inner axial wall 705, and a radial wall 706 extending between and interconnecting the outer axial wall 704 and the inner axial wall 705. The illustrated motor mount 309 further includes a first plurality of compressible tubular elements 707a extending upward from the radial wall 706 (i.e. toward the motor 315), and a second plurality of compressible tubular elements 707b extending downward from the radial wall 706 (i.e. away from the motor 315). The first plurality of tubular elements 707a abuts a lower end wall of the motor 315 to define a generally cup-shaped volumes 708a therebetween. Similarly, the second plurality of tubular elements 707b abuts a lower end wall of the lower casing 102 to define generally cup-shaped volumes 708b therebetween.

With reference to FIG. 7, the tubular elements 707a, 707b are arranged in an annular array, in a circumferential direction of the radial wall 706. The tubular elements 707a, 707b are positioned adjacent each other in the circumferential direction, with a spacing between consecutive tubular elements 707a, 707b being less than a width of one of the tubular elements 707a, 707b. In addition, as shown in FIG. 6, each of the first plurality of tubular elements 707a is axially aligned with a corresponding one of the second plurality of tubular elements 707b.

Figure 7A:
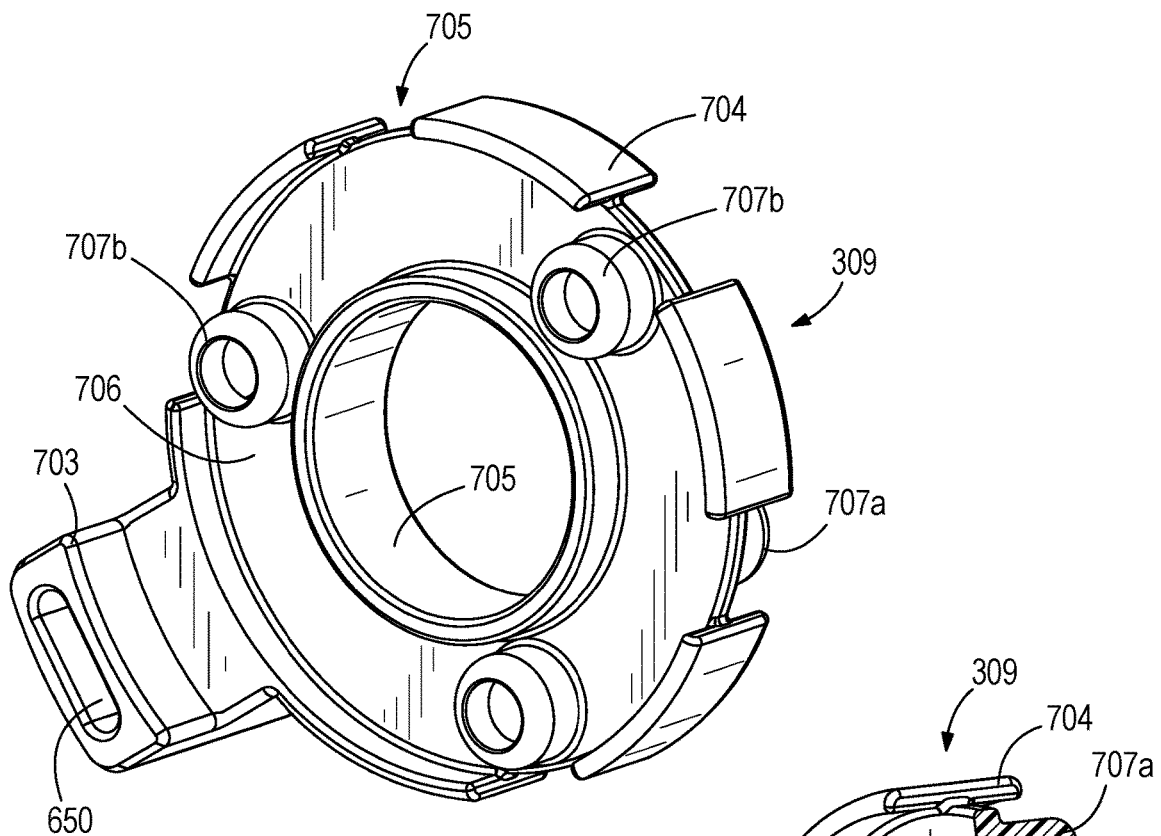
FIG. 7A illustrates a motor mount according to another embodiment, which may be incorporated into the pump assembly of FIG. 1.
Figure 7B:
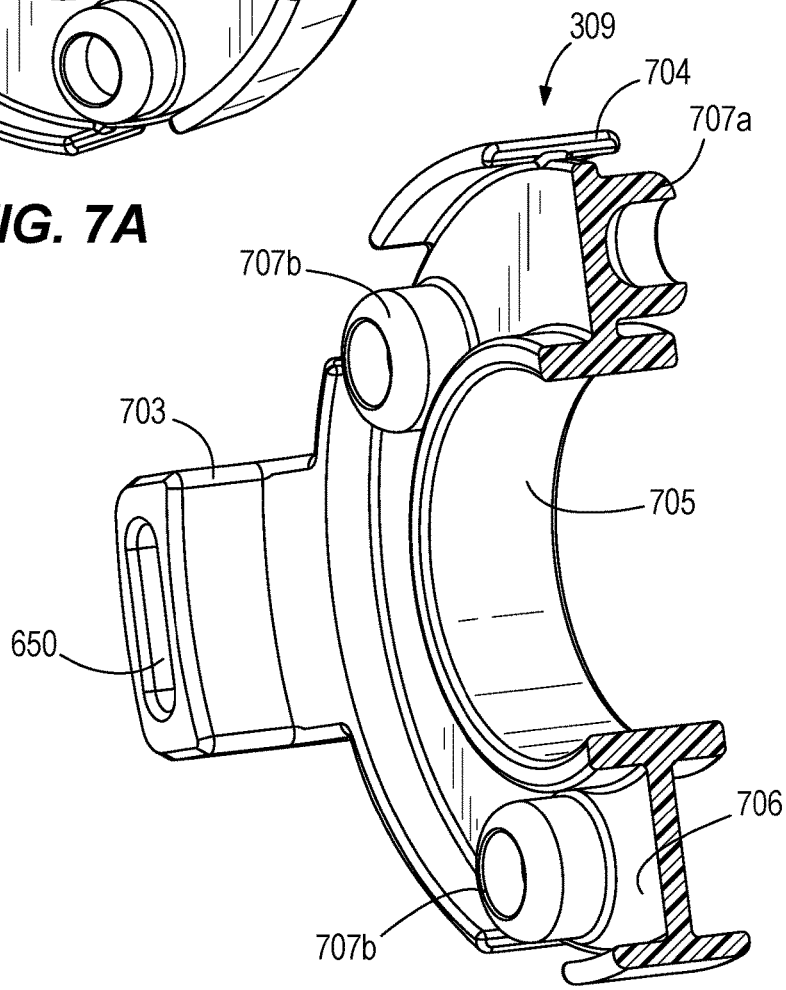
FIG. 7B is a cross-sectional view of the motor mount of FIG. 7A.

Referring to FIGS. 7A-7B, in another embodiment, the tubular elements 707a, 707b may be spaced further apart in the circumferential direction. For example, in the illustrated embodiment, a spacing between consecutive tubular elements 707a, 707b in the circumferential direction is greater than a width of one of the tubular elements 707a, 707b. In such embodiments, the tubular elements 707a, 707b include greater space to flex, thereby reducing the stiffness of the motor mount 309. Furthermore, in the illustrated embodiment, the first tubular elements 707a are axially misaligned with the second tubular elements 707b (FIG. 7B). The axial misalignment of the tubular elements 707a, 707b decreases the stiffness of the motor mount 309 in the axial direction. Finally, in the illustrated embodiment the outer axial wall 704 includes a plurality of gaps 709, which may be aligned in a radial direction with each of the tubular elements 707a, 707b. The gaps 709 in the outer axial wall 704 may permit additional expansion of the tubular elements 707a, 707b (e.g., into the gaps 709) and thereby further increase dampening performance. In yet other embodiments, the motor mount 309 may include other configurations, such as a honeycomb pattern.

With reference to FIGS. 6-7B, the tubular elements 707a, 707b reduce the weight and amount of material required to form the motor mount 309 (as compared to a motor mount that is solid through its entire thickness), while providing a desired amount of compressibility. In addition, the tubular elements 707a, 707b attenuate vibration of the motor 315 along multiple axes via a dampening effect. For example, in some embodiments, vibration of the motor 315 causes compression of the tubular elements 707a, 707b, which reduces the size of the cup-shaped volumes 708a, 708b (FIG. 6). This forces air out of the cup-shaped volumes 708a, 708b. Because the tubular elements 707a, 707b abut the motor 315 and the lower casing 102 (but without forming an air-tight seal), air flow into and out of the volumes 708a, 708b is restricted. Each of the tubular elements 707a, 707b may thus act as a dashpot to attenuate vibration along multiple axes.

In the illustrated embodiment, the motor mount 309 also includes a radial projection 703. The inlet opening 650 extends through the radial projection 703 to allow the electrical connection 105 to pass from the connector 104, through the motor mount 309, and into the lower pump assembly 305 such the electricity may be supplied to the pneumatic pump 410. In the illustrated embodiment, the entire motor mount 309, including the radial projection 703, the walls 704, 705, 706, and the tubular elements 707a, 707b, is integrally formed as a single piece of resilient material via a suitable molding process. In other embodiments, however, the motor mount 309 may be formed in other ways.

The embodiments described and illustrated herein thus provide a method of reducing vibration of the pump assembly 100 that may include supporting the lower pump assembly 305 and/or the upper pump assembly 306 within the upper casing 101 and the lower casing 102 with the seal 310 and/or the motor mount 309. The seal 310 and/or the motor mount 309 may be configured to dampen vibration in the axial direction (i.e., along the central axis 408) and/or the radial direction (i.e., radially in a plane perpendicular to the central axis 408).

The embodiments described and illustrated herein further provide a method of directing air from a pump to an application that may include providing compressed air from the pneumatic pump, directing the air through the upper assembly outlet 407 positioned on the outlet plate 307 and into the first volume 401, with the first volume 401 defined at least by the outlet plate 307 and the end cap 308. The method may additionally or alternatively include directing the air from the first volume 401, through the outlets 501 positioned on the end cap 308 and into the second volume 402, the second volume 402 defined by at least the end cap 308 and the upper casing 101. The method may additionally or alternatively include directing the air from the second volume 402 and through the upper casing outlet 103. In an embodiment, the upper casing outlet 103 is connected to a pneumatic line or other structure where compressed air may be desired.

Figure 8:
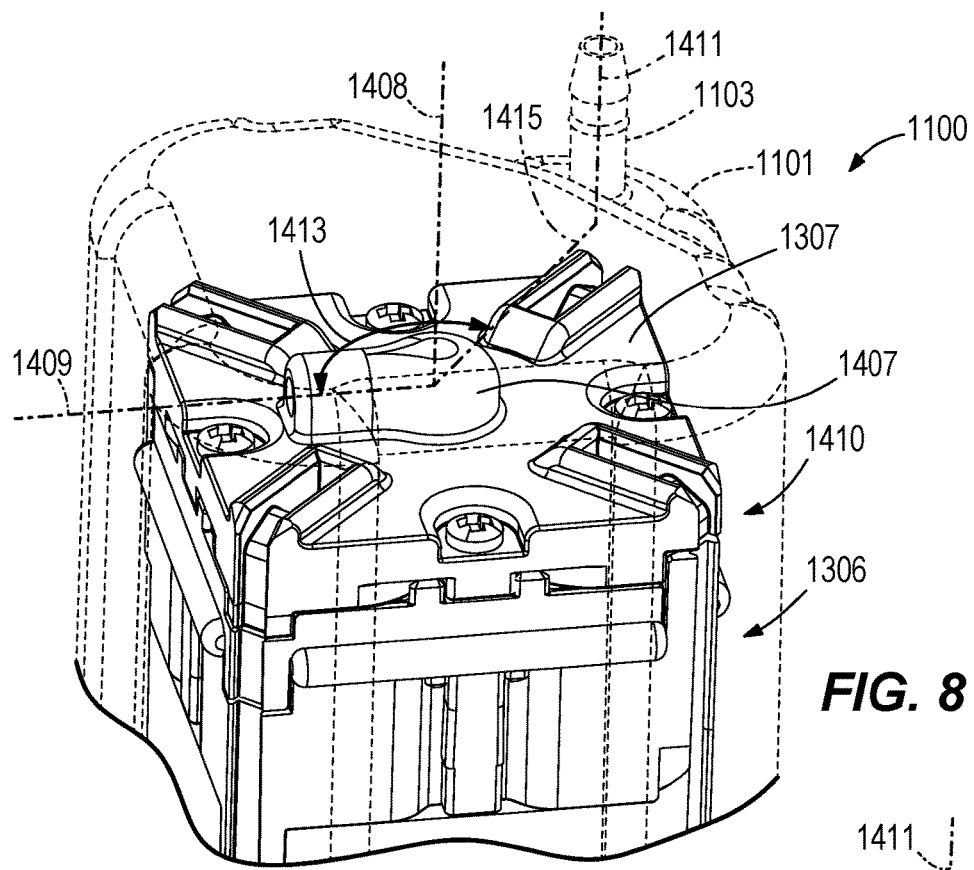
FIG. 8 is a perspective view illustrating a portion of a pump assembly according to another embodiment, with an upper casing of the pump assembly shown partially transparent.
Figure 9:
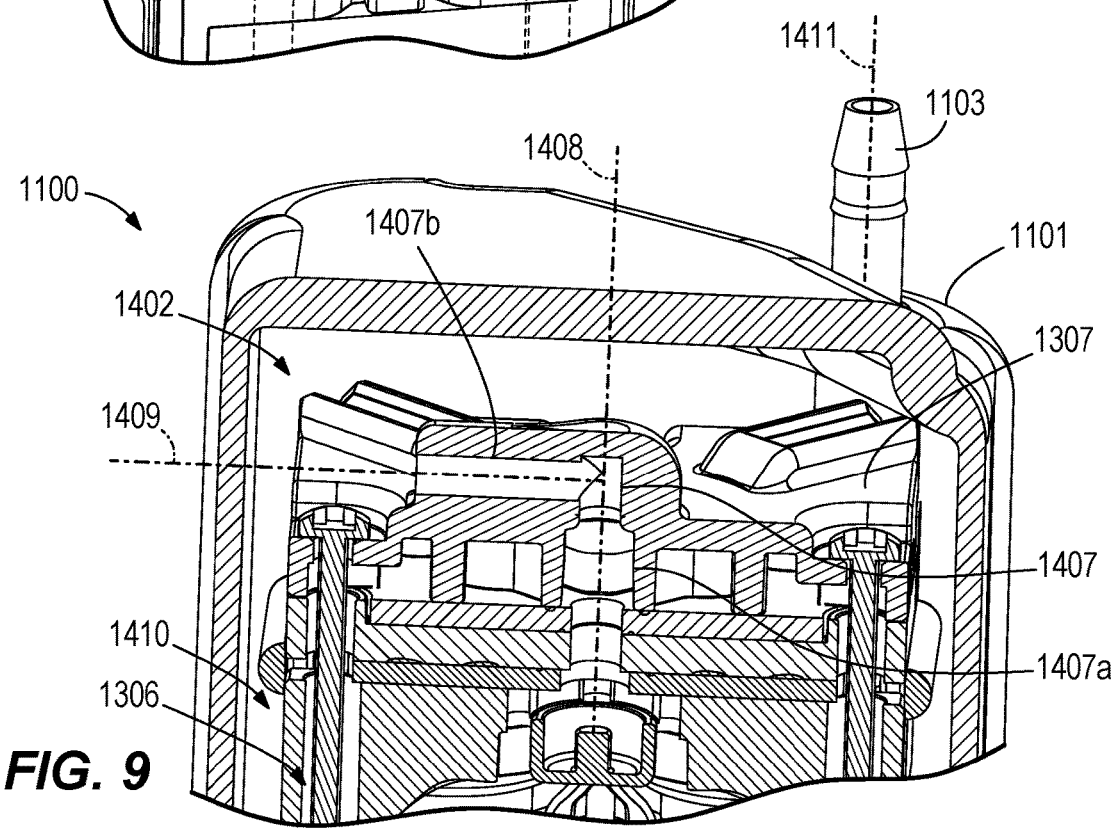
FIG. 9 is a cross-sectional view of the portion of the pump assembly of FIG. 8, taken along a central axis of the pump assembly.

FIGS. 8 and 9 illustrate a portion of a pump assembly 1100 according to another embodiment. The pump assembly 1100 is similar to the pump assembly 100 described above with reference to FIGS. 1-7, and features and elements of the pump assembly 1100 corresponding with features and elements of the pump assembly 100 are given identical reference numbers plus 1000. In addition, the following description focuses primarily on differences between the pump assembly 1100 and the pump assembly 100.

With reference to FIGS. 8-9, the illustrated pump assembly 1100 includes a pneumatic pump 1410 having an outlet plate 1307. The pneumatic pump 1410 may pump air through an upper assembly outlet 1407 in the outlet plate 1307. In the illustrated embodiment, the upper assembly outlet 1407 includes a first portion 1407a, which may extend along or parallel to a longitudinal axis or central axis 1408 of the pump assembly 1100, and a second portion 1407b downstream of the first portion 1407a (FIG. 9). The second portion 1407b may extend radially outward from the central axis 1408 and along a second axis 1409 oriented at an angle with respect to the central axis 1408. In the illustrated embodiment, the second axis 1409 is oriented perpendicular to the central axis 1408; however, the second axis 1409 may be oriented at other angles relative to the central axis 1408. As such, air that is pumped by the pneumatic pump 1410 may change direction at the transition between the first portion 1407a and the second portion 1407b, and may then be discharged from the second portion 1407b (e.g., in a direction generally perpendicular to the central axis 1408).

The second portion 1407b of the upper assembly outlet 1407 may be in fluid communication with a volume or chamber 1402 surrounding the upper pump assembly 1306 (FIG. 9). The volume 1402 may be defined, for example, between the upper pump assembly 1306 and the upper casing 1101. In other words, the upper casing 1101 may be spaced from the outside of the upper pump assembly 1306 to define the volume 1402 therebetween. The air that is discharged from the second portion 1407b of the upper assembly outlet 1407 may enter the volume 1402 before being discharged from the upper casing 1101 via the upper casing outlet 1103.

The upper casing outlet 1103 may extend along a third axis 1411 that is parallel to the central axis 1408. The second portion 1407b of the upper assembly outlet 1407 may extend generally away from the upper casing outlet 1103. For example, referring to FIG. 8, the second axis 1409 may be oriented at an angle 1413 relative to a line 1415 extending between the central axis 1408 and the third axis 1411. The angle 1413 may be between about 45 degrees and about 180 degrees in some embodiments, between about 90 degrees and about 180 degrees in some embodiments, or between about 120 degrees and about 180 degrees in some embodiments.

Because the volume 1402 is disposed fluidly between the upper assembly outlet 1407 and the upper casing outlet 1103, air discharged from the pneumatic pump 1410 through the upper assembly outlet 1407 must pass through the volume 1402 before being discharged from the pump assembly 1100 through the upper casing outlet 1103. In addition, the orientation of the second portion 1407b of the upper assembly outlet 1407 (e.g., perpendicular to the central axis 1408 and oriented generally away from the upper casing outlet 1103) and the orientation of the upper casing outlet 1103 (e.g., parallel to the central axis 1408) may also force the pumped air to change directions and thereby form a tortuous pathway for the pumped air. These features may advantageously reduce downstream noise amplification effects and provide for quieter operation of the pump assembly 1100 (e.g., in a pneumatic system such as the pneumatic system 200).

Figure 10:
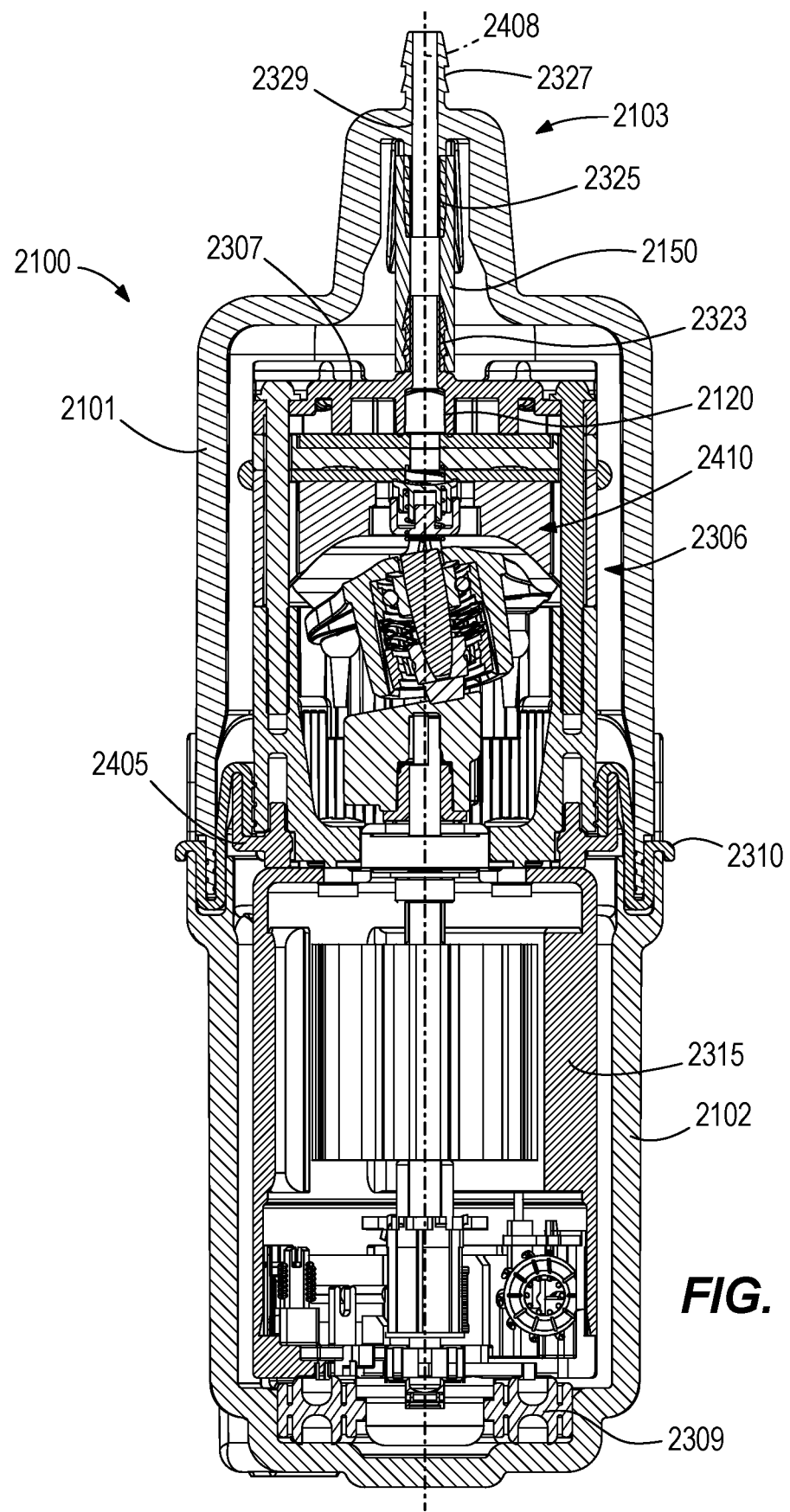
FIG. 10 is a cross-sectional view illustrating a pump assembly according to another embodiment.

FIG. 10 illustrates a pump assembly 2100 according to another embodiment. The pump assembly 2100 is similar to the pump assembly 100 described above with reference to FIGS. 1-7, and features and elements of the pump assembly 2100 corresponding with features and elements of the pump assembly 100 are given identical reference numbers plus 2000. In addition, the following description focuses primarily on differences between the pump assembly 2100 and the pump assembly 100.

With reference to FIG. 10, the illustrated pump assembly 2100 includes a first or upper casing 2101 connected to a second or lower casing 2102. An electric motor 2315 is disposed at least partially within the lower casing 2102. An upper pump assembly 2306, which includes a pneumatic pump 2410 (e.g., a diaphragm pump) in the illustrated embodiment, is disposed at least partially within the upper casing 2101. As such, the upper casing 2101 and lower casing 2102 cooperate to enclose the motor 2315 and the upper pump assembly 2306.

A seal 2310, which may be similar to the seal 310 described above with reference to FIG. 4, is positioned between the upper casing 2101 and the lower casing 2102. The seal 2310 extends between a support flange 2405 fixed to a lower end of the upper pump assembly 2306 and an inner wall of the upper casing 2101. The seal 2310 is made of a flexible material, such as rubber, silicone, other resilient elastomeric materials, or the like. As such, the seal 2310 provides a vibration-isolating or dampening connection between upper pump assembly 2306 and the upper casing 2101.

With continued reference to FIG. 10, in the illustrated embodiment, the lower end of the motor 2315 is supported by a motor mount 2309, which may be similar to the motor mount 309 described above with reference to FIGS. 6-8. The motor mount 2309 is made of a flexible material, such as rubber, silicone, other resilient elastomeric materials, or the like. As such, the motor mount 2309 provides a vibration-isolating or dampening connection between the motor 2315 and the lower casing 2102.

The upper pump assembly 2306 includes an outlet plate 2307 and an outlet plate fitting 2323 that extends from the outlet plate 2307 along a central axis 2408 of the pump assembly 2100. In the illustrated embodiment, the outlet plate fitting 2323 is configured as a barb fitting; however, the outlet plate fitting 2323 may be configured differently in other embodiments. The outlet plate fitting 2323 is integrally formed with the outlet plate 2307 in the illustrated embodiment (e.g., as a molded part). Alternatively, the outlet plate fitting 2323 may be formed separately and coupled to the outlet plate 2307 via any suitable connection (and preferably an air-tight connection, such as a threaded connection). An outlet plate discharge passage 2120 extends through the outlet plate 2307 and the outlet plate fitting 2323 and provides an outlet for air to exit the upper pump assembly 2306.

The upper casing 2101 includes an upper casing outlet 2103 positioned at an end of the upper casing 2101. The illustrated upper casing outlet 2103 includes an inner fitting 2325 extending from an interior side of the upper casing 2101 and an outer fitting 2327 extending from an exterior side of the upper casing 2101. The inner fitting 2325 and the outer fitting 2327 are each configured as barb fittings integrally formed with the upper casing 2101 (e.g., as a molded part) in the illustrated embodiment. In other embodiments, the inner fitting 2325 and/or the outer fitting 2327 may have other configurations and may be formed separately and coupled to the upper casing 2101 via any suitable connection (and preferably an air-tight connection, such as a threaded connection). An upper casing outlet passage 2329 extends through the fittings 2325, 2327 and provides an outlet for air to exit the upper casing 2101.

In the illustrated embodiment, the outlet plate discharge passage 2120 and the upper casing outlet passage 2329 are each coaxially aligned with the central axis 2408 of the pump assembly 2100. In other embodiments, the upper casing outlet passage 2329 or a portion thereof may be parallel to the central axis 2408 or oriented at an angle (e.g., a 90-degree angle) relative to the central axis 2408. In yet other embodiments, the outlet plate discharge passage 2120 or a portion thereof may be parallel to the central axis 2408 or oriented at an angle (e.g., a 90-degree angle) relative to the central axis 2408.

With continued reference to FIG. 10, a tube 2150 fluidly connects the outlet plate discharge passage 2120 and the upper casing outlet passage 2329 such that air pumped by the pneumatic pump 2410 may flow from the outlet plate discharge passage 2120 to the upper casing outlet passage 2329 via the tube 2150. The tube 2150 extends linearly along the central axis 2408 in the illustrated embodiment, from the outlet plate fitting 2323 to the inner fitting 2325. In other embodiments, the tube 2150 may be curved.

The tube 2150 couples the upper pump assembly 2306 to the upper casing 2101 to partially support the upper pump assembly 2306 within the upper casing 2101. In the illustrated embodiment, the tube 2150 is made of a flexible material, such as rubber, silicone, other resilient elastomeric materials, or the like. As such, the tube 2150 provides a vibration-isolating or dampening connection between the outlet plate 2307 and the upper casing 2101. In other embodiments, the tube 2150 may be made of a more rigid material, and an elastomeric member (e.g., an o-ring; not shown) may be positioned between the tube 2150 and one of the outlet plate fitting 2323 or the inner fitting 2325. In such embodiments, the tube 2150 and the elastomeric member define the vibration-isolating or dampening connection between the outlet plate 2307 and the upper casing 2101, and the tube 2150 may optionally be integral with the outlet plate fitting 2323 or the inner fitting 2325.

Thus, the tube 2150, seal 2310, and motor mount 2309 collectively support the upper pump assembly 2306 and the motor 2315 within the upper casing 2101 and the lower casing 2102. In the illustrated embodiment, the tube 2150, seal 2310, and motor mount 2309 are the only contact points between the upper pump assembly 2306, the motor 2315, and the casings 2101, 2102. That is, the upper pump assembly 2306 and the motor 2315 are fully supported by the vibration-dampening/isolating mounts of the tube 2550, the seal 2310, and motor mount 2309, which are spaced apart from one another along the central axis 2408. The resilient characteristics of the tube 2550, seal 2310, and motor mount 2309 permit limited relative movement of the motor 2315 and the pneumatic pump 2410 relative to the upper and lower casings 2101, 2102 and therefore isolate the upper casing 2101 and the lower casing 2102 from vibration produced by the motor 2315 and the pneumatic pump 2410 during operation. As such, the noise generated by the pump assembly 2100 during operation is advantageously reduced.

Figure 11:
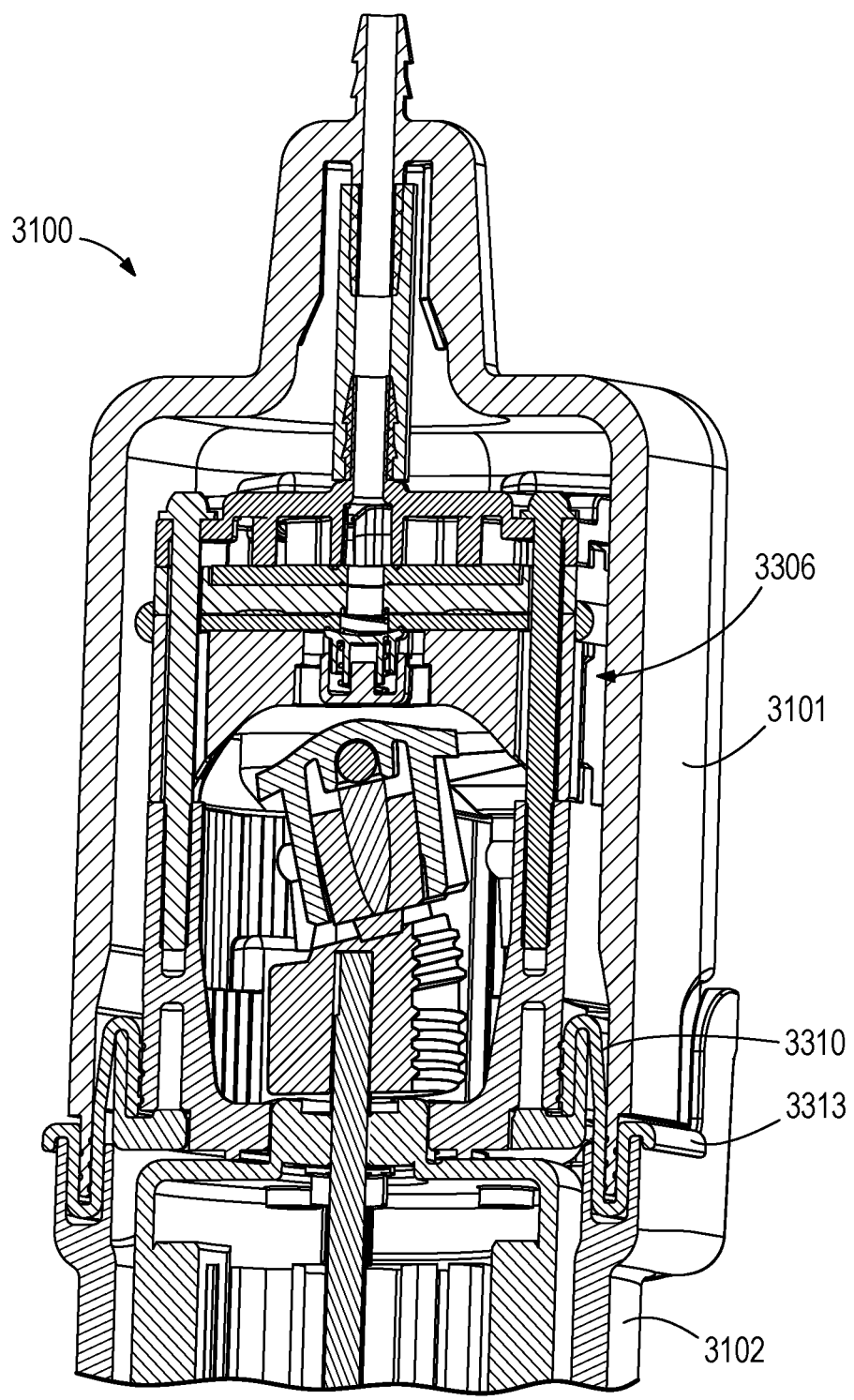
FIG. 11 is a cross-sectional view illustrating a portion of a pump assembly according to another embodiment.
Figure 12:
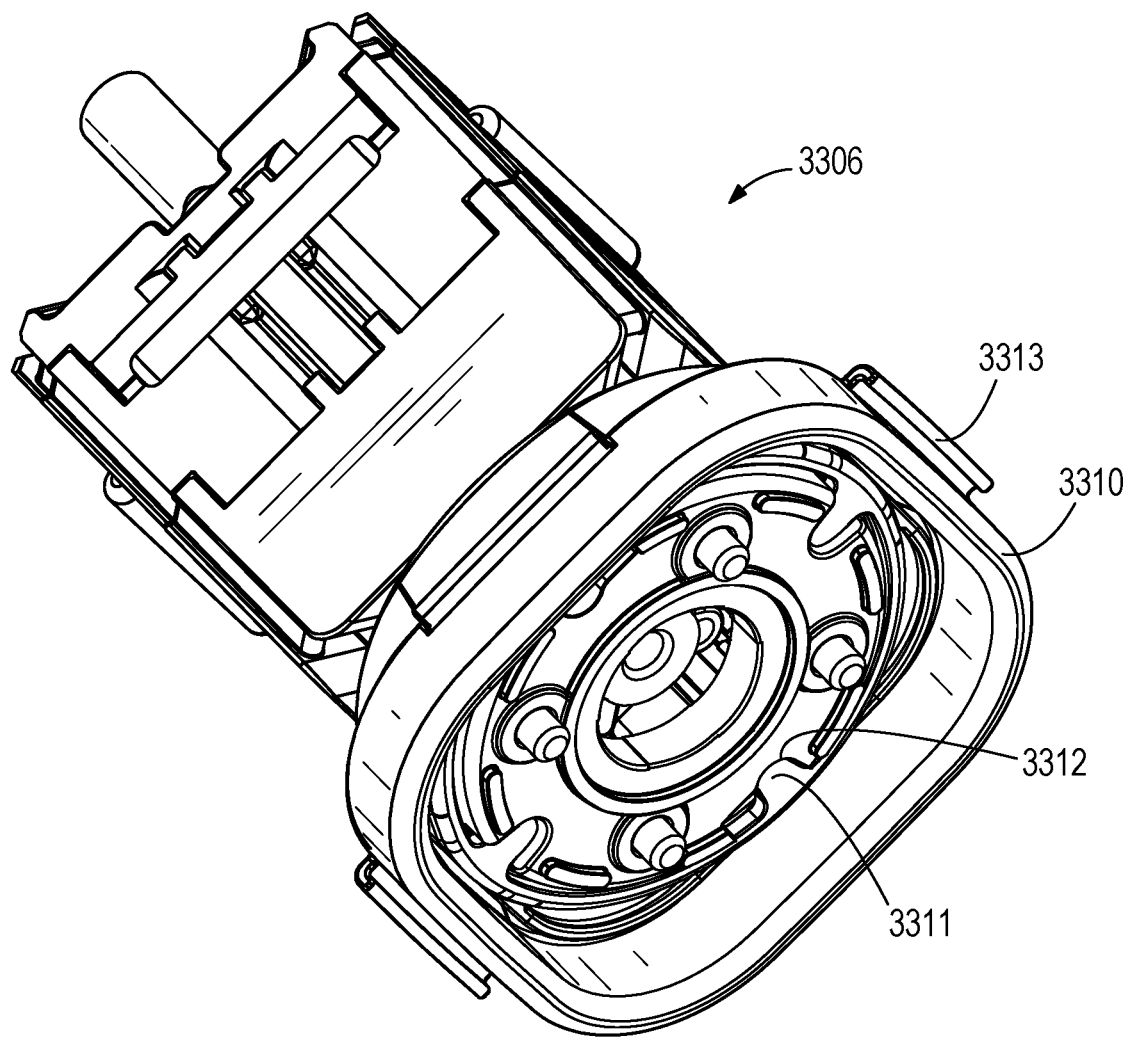
FIG. 12 is a perspective view illustrating a seal of the pump assembly of FIG. 11.

FIGS. 11-12 illustrate portions of a pump assembly 3100 according to another embodiment. The pump assembly 3100 is similar to the pump assembly 2100 described above with reference to FIG. 10, and features and elements of the pump assembly 3100 corresponding with features and elements of the pump assembly 2100 are given identical reference numbers plus 1000. In addition, the following description focuses primarily on differences between the pump assembly 3100 and the pump assembly 2100.

The pump assembly 3100 includes a seal 3310 positioned between the upper casing 3101 and the lower casing 3102 (FIG. 11). The illustrated embodiment of the pump assembly 3100 does not include a support flange engaged with the seal 3310. Rather, as illustrated in FIG. 12, the seal 3310 includes a plurality of inwardly extending projections 3311 that are received in corresponding recesses 3312 formed in the bottom end of the upper pump assembly 3306 to couple the inner end of the seal 3310 to the upper pump assembly 3306. The outer end of the seal 3310 includes a plurality of hook-shaped projections 3313. The projections 3313 engage an edge of the lower casing 3102 to couple the outer end of the seal 3310 to the lower casing 3102.

The seal 3310 is made of a flexible material, such as rubber, silicone, other resilient elastomeric materials, or the like. As such, the seal 3310 provides a vibration-isolating or dampening connection between upper pump assembly 3306 and the casings 3101, 3102.

Figure 13:
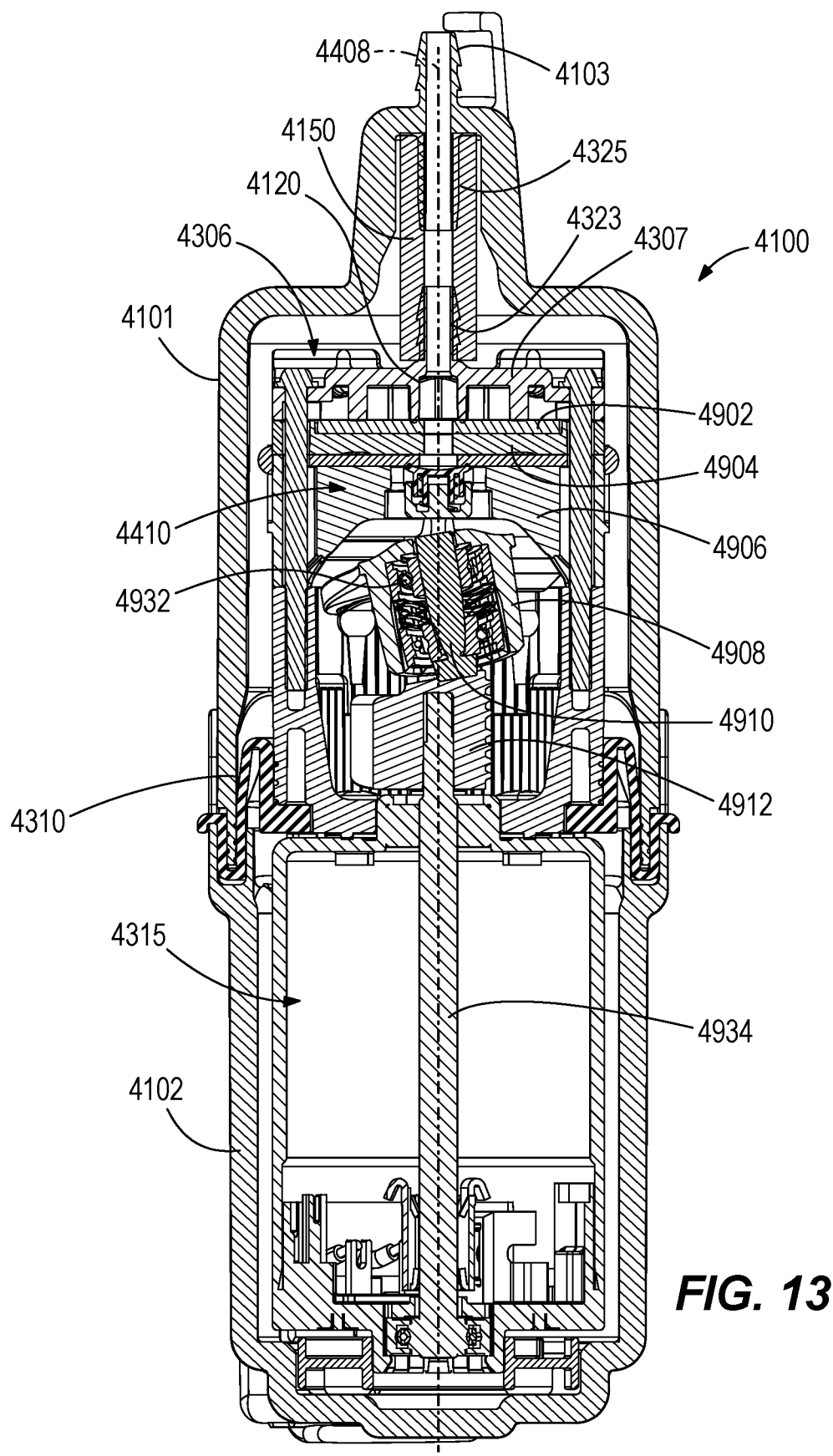
FIG. 13 is a cross-sectional view illustrating a pump assembly according to another embodiment.

FIG. 13 illustrates a pump assembly 4100 according to another embodiment. The pump assembly 4100 is similar to the pump assemblies described above, and features and elements of the pump assembly 4100 are given reference numbers in the '4000' series. It should be understood that features of the pump assembly 4100 may be incorporated into the pump assemblies described above and vice versa.

With reference to FIG. 13, the illustrated pump assembly 4100 includes a first or upper casing 4101 connected to a second or lower casing 4102. An electric motor 4315 is disposed at least partially within the lower casing 4102. An upper pump assembly 4306 including a pneumatic pump 4410 is disposed at least partially within the upper casing 4101. As such, the upper casing 4101 and lower casing 4102 cooperate to enclose the motor 4315 and the pneumatic pump 4410.

A seal 4310, which may be similar to the seal 2310 described above, is positioned between the upper casing 4101 and the lower casing 4102. In the illustrated embodiment, an inner periphery of the seal 4310 is directly attached to a lower end of the upper pump assembly 4306. The seal 4310 is made of a flexible material, such as rubber, silicone, other resilient elastomeric materials, or the like. As such, the seal 4310 provides a vibration-isolating or dampening connection between upper pump assembly 4306 and the upper casing 4101.

The upper pump assembly 4306 includes an outlet plate 4307 and an outlet plate fitting 4323 that extends from the outlet plate 4307 along a central axis 4408 of the pump assembly 4100. An outlet plate discharge passage 4120 extends through the outlet plate 4307 and the outlet plate fitting 4323 and provides an outlet for air to exit the upper pump assembly 4306.

The upper casing 4101 includes an upper casing outlet 4103 positioned at an end of the upper casing 4101. The illustrated upper casing outlet 4103 includes an inner fitting 4325 extending from an interior side of the upper casing 4101. A tube 4150 interconnects the outlet plate fitting 4323 and the inner fitting 4325 such that air pumped by the pneumatic pump 4410 may flow from the outlet plate discharge passage 4120 to the upper casing outlet 4103 via the tube 2150.

Figure 14:
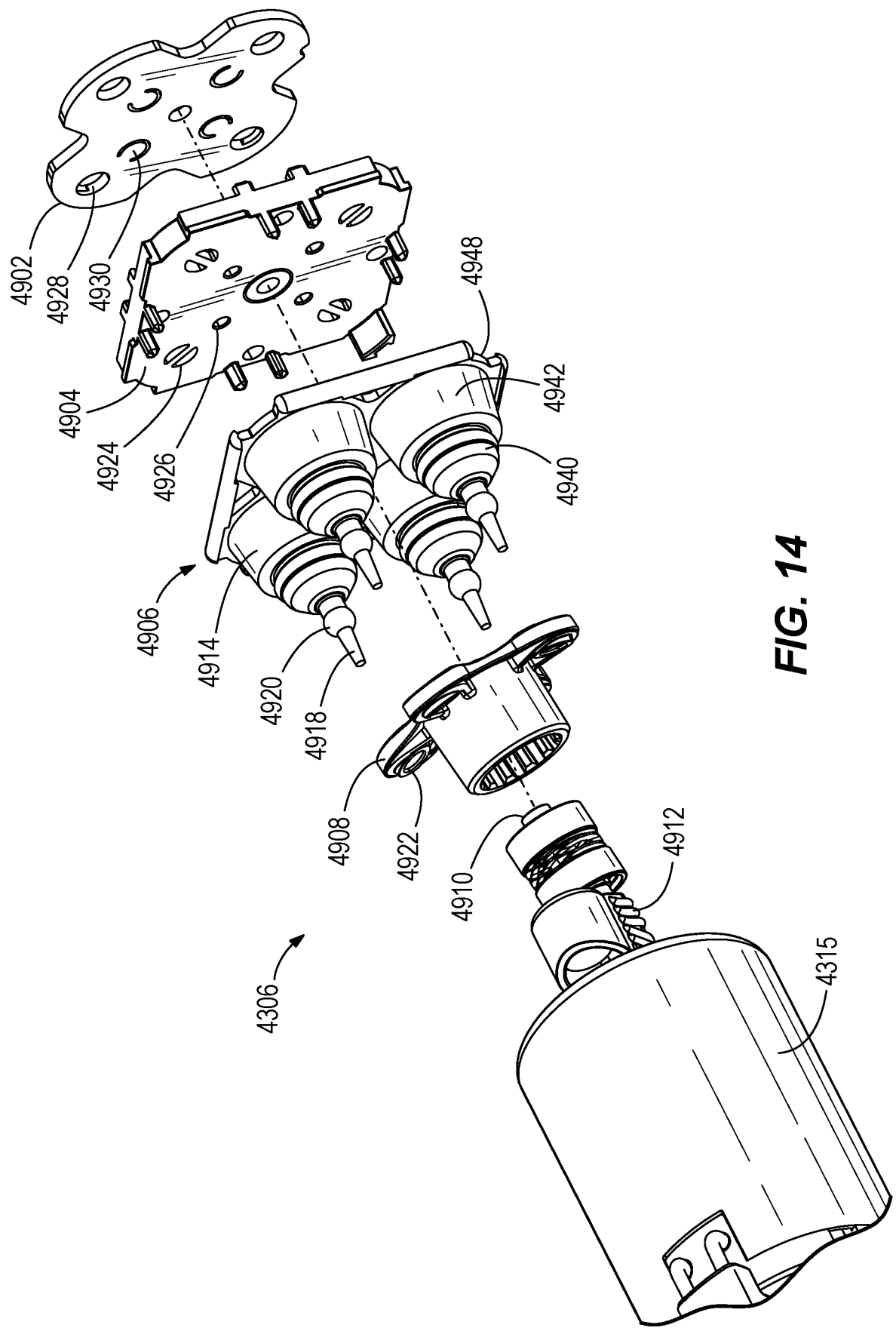
FIG. 14 is an exploded view of a portion of the pump assembly of FIG. 13.

With reference to FIGS. 13-14, the upper pump assembly 4306 further includes a valve plate 4902, a head plate 4904, a diaphragm assembly 4906, a wobble plate 4908, an eccentric shaft 4910, and a crank 4912. The illustrated diaphragm assembly 4906 includes a plurality of cup-shaped diaphragms 4914 and a plunger 4916 extending from the center of each respective diaphragm 4914 (FIG. 14). Each of the plungers 4916 includes a stem portion 4918 that extends through the wobble plate 4908 and a bead 4920 formed on the stem portion 4918 and having a larger diameter than the remainder of the stem portion 4918. During assembly, the bead 4920 of each plunger 4916 is compressed and inserted through a corresponding bore 4922 in the wobble plate 4908. The bore 4922 has a smaller diameter than the bead 4920 so as to retain the stem portions 4918 of the plungers 4916 within the wobble plate 4908. In the illustrated embodiment, the diaphragm assembly 4906 includes four diaphragms 4914 and plungers 4916; however, the diaphragm assembly 4906 may include one, two, three, or more than four diaphragms 4914 and plungers 4916 in other embodiments.

Referring to FIG. 14, the head plate 4904 includes an inlet opening 4924 and an outlet opening 4926 in fluid communication with an interior volume of each respective diaphragm 4914. The valve plate 4902 overlies the head plate 4904 and includes a one-way inlet valve 4928 in fluid communication with the inlet opening 4924 and a one-way outlet valve 4930 in fluid communication with the outlet opening 4926. The inlet and outlet valves 4928, 4930 are configured as reed valves in the illustrated embodiment and are integrally formed with the valve plate 4902. In other embodiments, other types of one-way valves may be used.

With reference to FIG. 13, the wobble plate 4908 is rotatably supported on the eccentric shaft 4910 by bearings 4932. The eccentric shaft 4910 is eccentrically mounted on the crank 4912, which in turn is coupled for co-rotation with an output shaft 4934 of the electric motor 4315. As such, rotation of the output shaft 4934 rotates the crank 4912. The eccentric shaft 4910 is oriented and positioned so as to impart a wobbling motion to the wobble plate 4908. More specifically, each corner of the wobble plate 4908 is sequentially moved up and down, in a direction generally parallel to the central axis 4408, which imparts a reciprocating (i.e. up and down) motion to the plungers 4916 of the diaphragm assembly 4906.

Figure 15:
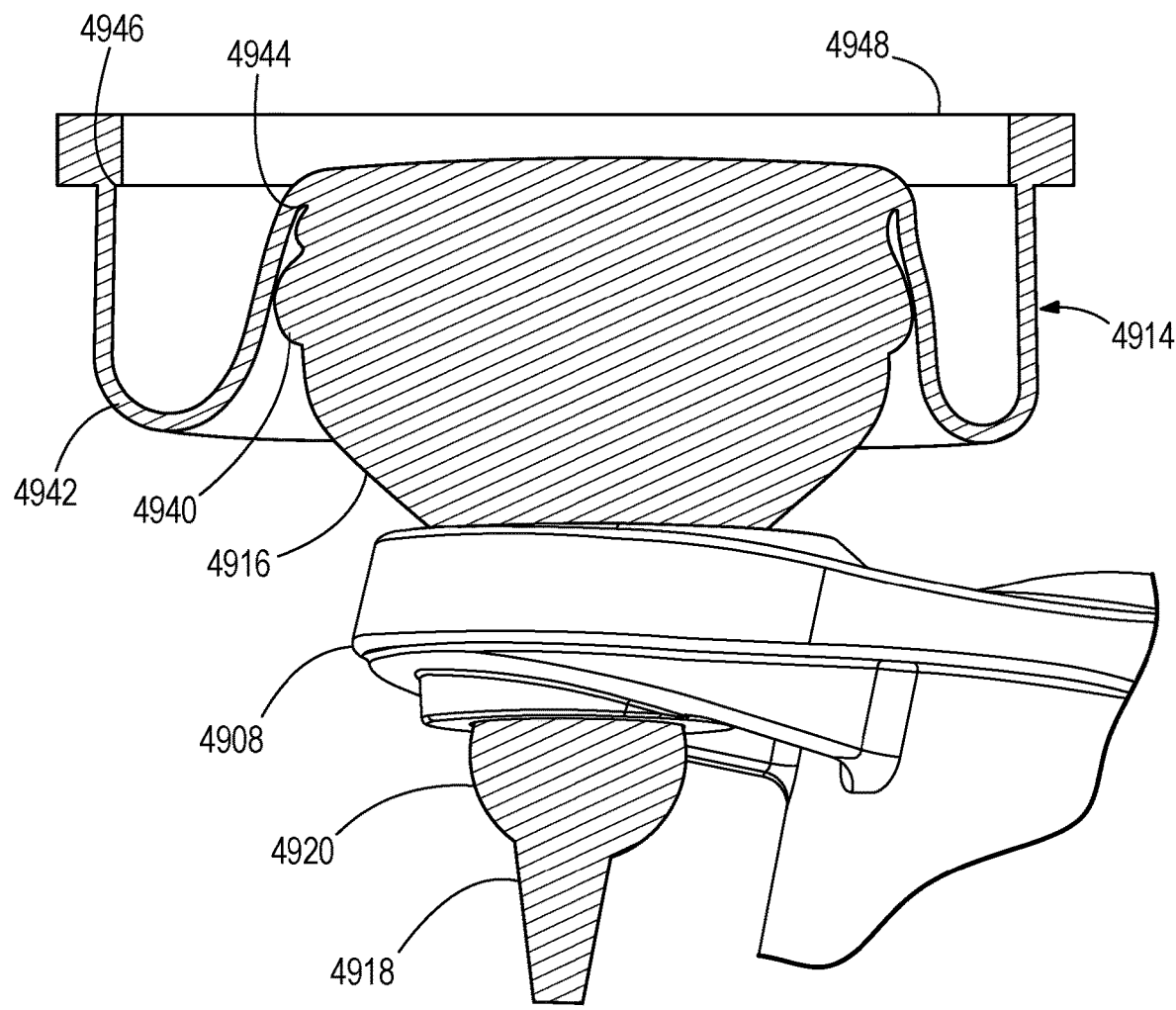
FIG. 15 is a cross-sectional view of a diaphragm of the pump assembly of FIG. 13.

In operation, as each plunger 4916 is moved up, the interior volume of the associated cup-shaped diaphragm 4914 is compressed, as illustrated in FIG. 15. This expels air from the interior volume of the diaphragm 4914, out through the associated outlet opening 4926 in the head plate 4904 and outlet valve 4930 in the valve plate 4902. The expelled air is routed into the outlet plate 4307, and ultimately discharged through the upper casing outlet 4103. As each plunger 4916 is moved back downward, the interior volume of the associated diaphragm 4914 expands, which draws air into the interior volume of the diaphragm 4914, through the associated inlet opening 4924 and inlet valve 4928.

With continued reference to FIG. 15, each plunger 4916 in the illustrated embodiment includes a circumferential rib 4940. The rib 4940 has a rounded outer profile and is engageable with a wall 4942 of the diaphragm 4914 as the diaphragm 4914 is moved toward its compressed position (shown in FIG. 15). In the illustrated embodiment, the rib 4940 engages the wall 4942 of the diaphragm 4914 at a position approximately half way between an inner edge 4944 of the wall 4942, where the wall 4942 connects to the plunger 4916, and an outer edge 4946 of the wall 4942, where the wall 4942 connects to a surrounding flange 4948 of the diaphragm assembly 4906. The engagement between the rib 4940 and the wall 4942 supports the wall 4942 and prevents it from buckling. The inventors determined through testing and simulations that the rib 4940 on the plunger 4916 advantageously provides a strain reduction of at least 12% in the wall 4942 of the diaphragm 4914, compared to other embodiments in which the rib 4940 is omitted, resulting in significantly improved durability and lifespan of the diaphragm assembly 4906.

Although the present disclosure has been described in detail with reference to certain preferred embodiments, variations and modifications exist within the scope and spirit of one or more independent aspects of the disclosure as described.

Various features and aspects of the present disclosure are set forth in the following claims.

What is claimed is:

1. A pump assembly comprising:
a diaphragm including a wall defining an interior volume;
a plunger coupled to the wall at an inner end of the wall, the plunger including a circumferential rib;
a flange coupled to the wall at an outer end of the wall, and
a motor operatively coupled with and configured to reciprocate the plunger to perform cycles of compressing and expanding the interior volume,
wherein the circumferential rib is engageable with the wall at a first point between the inner end and the outer end to support the wall and prevent the wall from buckling,
wherein the plunger does not engage the wall at a second point between the inner end and the first point, and
wherein the circumferential rib is positioned such that it does not engage the wall of the diaphragm to support the wall and prevent the wall from buckling until the diaphragm moves toward its compressed position.

2. The pump assembly of claim 1, further comprising a wobble plate coupled to the plunger.

3. The pump assembly of claim 1, wherein the circumferential rib has a rounded outer profile.

4. The pump assembly of claim 1, wherein the first point is a midpoint of the wall between the inner end and the outer end.

5. The pump assembly of claim 1, wherein the diaphragm and the plunger are integrally formed together as a single piece.

6. The pump assembly of claim 1, wherein the diaphragm is a first diaphragm of a plurality of identical diaphragms, and wherein the plunger is a first plunger of a plurality of identical plungers.

7. The pump assembly of claim 1, wherein the plunger includes a stem portion having a bead.

8. The pump assembly of claim 1, further comprising a flange coupled to the wall of the diaphragm at a first edge of the wall, wherein the plunger is coupled to the wall at a second edge of the wall, and wherein the circumferential rib is engageable with the wall at a point on the wall spaced from the second edge.

9. The pump assembly of claim 1 further comprising
a pump body having a discharge passage,
wherein the motor is operable to force compressed air from the diaphragm through the discharge passage when the diaphragm is compressed;
a casing at least partially surrounding the pump body and the motor; and
a motor mount at least partially supporting the motor within the casing, the motor mount including
an outer axial wall,
an inner axial wall,
a radial wall extending between the outer axial wall and the inner axial wall,
a first plurality of projections extending from the radial wall toward the motor, and
a second plurality of projections extending from the radial wall away from the motor.

10. The pump assembly of claim 9, wherein each projection of the first plurality of projections and each projection of the second plurality of projections has a tubular shape.

11. The pump assembly of claim 9, wherein each projection of the first plurality of projections abuts an end wall of the motor.

12. The pump assembly of claim 11, wherein each projection of the first plurality of projections defines a cup-shaped interior volume.

13. The pump assembly of claim 9, wherein each projection of the second plurality of projections abuts an end wall of the casing.

14. The pump assembly of claim 13, wherein each projection of the second plurality of projections defines a cup-shaped interior volume.

15. The pump assembly of claim 9, wherein the motor mount is configured to dampen vibration of the motor in axial and radial directions of the motor.

16. The pump assembly of claim 9, wherein the first plurality of projections is arranged in an annular array extending in a circumferential direction of the radial wall, and wherein consecutive projections of the first plurality of projections in the circumferential direction are spaced apart by a distance greater than a width of one of the consecutive projections.

17. The pump assembly of claim 9, wherein the second plurality of projections is arranged in an annular array extending in a circumferential direction of the radial wall, and wherein consecutive projections of the second plurality of projections in the circumferential direction are spaced apart by a distance greater than a width of one of the consecutive projections.

18. The pump assembly of claim 9, wherein the first plurality of projections and the second plurality of projections are configured to flex to dampen vibration of the motor relative to the casing.

19. The pump assembly of claim 9, wherein the first plurality of projections and the second plurality of projections are axially misaligned.

20. The pump assembly of claim 9, wherein the motor mount is integrally formed from a single piece of elastomeric material.

21. The pump assembly of claim 9, wherein the motor mount includes a passageway, and wherein the pump assembly is configured to draw air into the casing through the passageway.

22. A pump assembly comprising:
a diaphragm including a wall defining an interior volume;
a plunger coupled to the wall at an inner end of the wall, the plunger including a circumferential rib; and
a motor operatively coupled with and configured to reciprocate the plunger to perform cycles of compressing and expanding the interior volume,
wherein the circumferential rib is configured to engage a folded portion of the wall of the diaphragm at a first position between the inner end of the wall and an outer end of the wall as the interior volume is compressed, such that the rib supports the wall and prevents the wall from buckling as the interior volume is compressed, and
wherein the plunger does not engage the wall at a second position between the inner end and the first position.

23. The pump assembly of claim 22, further comprising a flange coupled to the wall of the diaphragm at the outer end of the wall.

24. The pump assembly of claim 22, wherein the first position is a midpoint of the wall.

* * * * *